US010553175B2

(12) United States Patent
Choi

(10) Patent No.: US 10,553,175 B2
(45) **Date of Patent: *Feb. 4, 2020**

(54) SOURCE DRIVER CIRCUIT AND DISPLAY DEVICE FOR REDUCING POWER CONSUMED BY NON-DISPLAY AREA OF DISPLAY PANEL

(71) Applicant: SAMSUNG ELECTRONICS CO., LTD., Suwon-si, Gyeonggi-do (KR)

(72) Inventor: Chulho Choi, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,502

(22) Filed: Mar. 20, 2019

(65) Prior Publication Data

US 2019/0221182 A1 Jul. 18, 2019

Related U.S. Application Data

(63) Continuation of application No. 15/910,334, filed on Mar. 2, 2018, now Pat. No. 10,255,872, which is a (Continued)

(30) Foreign Application Priority Data

Nov. 7, 2014 (KR) ........................ 10-2014-0154324

(51) Int. Cl.
*G06F 3/038* (2013.01)
*G09G 5/00* (2006.01)
(Continued)

(52) U.S. Cl.
CPC ......... *G09G 3/3688* (2013.01); *G09G 3/2092* (2013.01); *G09G 3/3648* (2013.01);
(Continued)

(58) Field of Classification Search
CPC ..... G09G 2310/027; G09G 2310/0275; G09G 2310/0289; G09G 2310/0291;
(Continued)

(56) References Cited

U.S. PATENT DOCUMENTS 7,372,445 B2 5/2008 Takahashi et al.
7,522,148 B2 4/2009 Maki
(Continued)

FOREIGN PATENT DOCUMENTS

JP 2002-162946 A 6/2002
JP 2002-258804 A 9/2002
(Continued)

*Primary Examiner* — Insa Sadio
(74) *Attorney, Agent, or Firm* — Lee & Morse, P.C.

(57) ABSTRACT

A source driver circuit includes a receiver, a plurality of amplifying buffers, and a control logic circuit. The receiver receives a data signal and a control signal through an input terminal. Each of the amplifying buffers outputs a driving signal generated based on the image data signal through an output terminal. The control logic circuit controls the receiver and the plurality of amplifying buffers based on the control signal. When a power-down signal is provided to the receiver, the control logic circuit is to turn off at least one of the receiver and the plurality of amplifying buffers.

11 Claims, 26 Drawing Sheets

Related U.S. Application Data continuation of application No. 14/882,688, filed on Oct. 14, 2015, now Pat. No. 9,922,614.

(51) Int. Cl.
*G09G 3/36* (2006.01)
*G09G 3/20* (2006.01)

(52) U.S. Cl.
CPC ................. *G09G 2310/027* (2013.01); *G09G 2310/0275* (2013.01); *G09G 2310/0289* (2013.01); *G09G 2310/0291* (2013.01); *G09G 2330/021* (2013.01); *G09G 2330/026* (2013.01); *G09G 2330/027* (2013.01); *G09G 2330/08* (2013.01); *G09G 2370/08* (2013.01)

(58) Field of Classification Search
CPC ....... G09G 2330/021; G09G 2330/026; G09G 2330/027; G09G 2330/08; G09G 2370/08; G09G 3/2092; G09G 3/3648; G09G 3/368
See application file for complete search history.

(56) References Cited

U.S. PATENT DOCUMENTS

| | | | | | |
|---|---|---|---|---|---|
| 8,421,791 | B2 | 4/2013 | Harada | | |
| 2005/0225526 | A1* | 10/2005 | Chiu | .................... | G09G 3/3688 345/98 |
| 2009/0213042 | A1* | 8/2009 | Hagino | ................ | G09G 3/2011 345/55 |

FOREIGN PATENT DOCUMENTS

| | | | |
|---|---|---|---|
| JP | 2002-311939 | A | 10/2002 |
| JP | 2002-351421 | A | 12/2002 |
| JP | 2003-005727 | A | 1/2003 |
| KR | 10-0706222 | B1 | 4/2007 |
| KR | 10-2013-0015121 | A | 2/2013 |

* cited by examiner

SOURCE DRIVER CIRCUIT AND DISPLAY DEVICE FOR REDUCING POWER CONSUMED BY NON-DISPLAY AREA OF DISPLAY PANEL

CROSS-REFERENCE TO RELATED APPLICATIONS

This is a continuation application based on pending application Ser. No. 15/910,334, filed Mar. 2, 2018, which in turn is a continuation of application Ser. No. 14/882,688, filed Oct. 14, 2015, now U.S. Pat. No. 9,922,614 B2, issued Mar. 20, 2018, the entire contents of both being hereby incorporated by reference.

Korean Patent Application No. 10-2014-0154324, filed on Nov. 7, 2014, in the Korean Intellectual Property Office, and entitled: "Source Driver Circuit and Display Device for Reducing Power Consumed by Non-Display Area of Display Panel," is incorporated by reference herein in its entirety.

BACKGROUND

1. Field

The present disclosure relates to a circuit configuration, and more particularly, relates to a source driver circuit used to drive a display panel and a display device including the source driver circuit.

2. Description of the Related Art

Nowadays, various kinds of electronic devices are being used. An electronic device includes one or more circuits. Each circuit of the electronic device performs its own function. The electronic device operates based on functions of circuits included therein.

A display device is one of electronic devices that are being used widely. As a display panel included in the display device displays images, the display device provides a user with visual information. The display device includes a gate driver circuit and a source driver circuit. The display panel displays images based on a gating signal provided from the gate driver circuit and a driving signal provided from the source driver circuit.

An image displayed on the display panel may include a display area for displaying visual information to be provided to the user. For example, the display device may perform a "partial display" function where the visual information to be provided to the user is displayed on a partial area of the display panel. In this example, the image displayed on the display panel may further include a non-display area where the visual information to be provided to the user is not displayed.

The display device may discriminate between the display area and the non-display area by displaying, for example, a black image or a blue image on the non-display area. In this example, the source driver circuit driving the non-display area outputs a driving signal for displaying the black image or the blue image.

SUMMARY

An example embodiment of the present disclosure is directed to a source driver circuit, including a receiver to receive a control signal and an image data signal through an input terminal, a plurality of amplifying buffers, each of the plurality of amplifying buffers including an output terminal to output a driving signal, the driving signal being generated based on the image data signal and the control signal, and a control logic circuit to control the receiver and the plurality of amplifying buffers based on the control signal. When a power-down signal is provided to the receiver, the control logic circuit is to turn off at least one of the receiver and the plurality of amplifying buffers.

The source driver circuit may include a plurality of switching elements respectively corresponding to the plurality of amplifying buffers, each of the plurality of switching elements to connect or disconnect a non-display voltage node, to which a non-display voltage having a voltage value for driving a non-display area of a display panel is applied, with an output terminal of a corresponding one of the plurality of amplifying buffers, wherein the control logic circuit is to control a connection between the non-display voltage node and the output terminal of each of the plurality of amplifying buffers by controlling the plurality of switching elements.

In a normal mode in which the receiver does not receive the power-down signal, the control logic circuit is to turn on the receiver and the plurality of amplifying buffers, and disconnect the non-display voltage node from the output terminal of each of the plurality of amplifying buffers.

In a power-down mode in which the receiver receives the power-down signal, the control logic circuit is to turn off the receiver and the plurality of amplifying buffers, and connect the non-display voltage node is connected to the output terminal of each of the plurality of amplifying buffers.

The source driver circuit may include a signal detector to detect a signal provided through the input terminal, wherein the control logic circuit is to turn on or turn off the receiver based on the detected signal.

The control logic circuit may turn on the receiver when the signal detector detects that the image data signal begins to be provided through the input terminal in the power-down mode.

The control logic circuit may turn on the plurality of amplifying buffers and disconnect the non-display voltage node from the output terminal of each of the plurality of amplifying buffers when the power-down signal is released after the receiver is turned on.

Whether the power-down signal is provided or not may be determined based on a logical value of one or more bits included in a bit stream of the control signal.

The source driver circuit may include a switching element to connect or disconnect a non-display voltage node, to which a non-display voltage having a voltage value for driving a non-display area of a display panel is applied, with the output terminal of each of the plurality of amplifying buffers, wherein the control logic circuit is to control a connection between the non-display voltage node and the output terminal of each of the plurality of amplifying buffers by controlling the switching element based on the power-down signal.

The power-down signal may be provided to the receiver, the control logic circuit is to turn off the plurality of amplifying buffers and connect the non-display voltage node to the output terminal of each of the plurality of amplifying buffers.

After the power-down signal is provided to the receiver and before the plurality of amplifying buffers is turned off, the plurality of amplifying buffers may output first driving signals, each having the voltage value for driving the non-display area, during a first set time.

When the power-down signal is released, the control logic circuit may turn on the plurality of amplifying buffers and disconnect the non-display voltage node from the output terminal of each of the plurality of amplifying buffers.

After the plurality of amplifying buffers is turned on, the plurality of amplifying buffers may output second driving signals, each having the voltage value for driving the non-display area, during a second set time, and output third driving signals generated based on the image data signal after the second set time passes.

The source driver circuit may include a signal detector to detect a signal provided through the input terminal, wherein the control logic circuit is to control turn-on or turn-off the receiver based on the detected signal.

When the power-down signal is provided to the receiver, the control logic circuit may turn off the receiver.

Wherein, when the signal detector detects that the image data signal begins to be provided through the input terminal with the receiver being turned off, the control logic circuit may turn on the receiver.

The source driver may include a selector to select and alternately output one of two non-display voltages, a dummy buffer receiving the non-display voltage from the selector, and a switching element between the dummy buffer and the output terminal of each of the plurality of amplifying buffers, wherein the control logic circuit is to control a connection between the dummy buffer and the output terminal of each of the plurality of amplifying buffers by controlling the switching element.

In a normal mode in which the receiver does not receive the power-down signal, the control logic circuit may turn on the receiver and the plurality of amplifying buffers, turn off the dummy buffer, and disconnect the dummy buffer from the output terminal of each of the plurality of amplifying buffers.

In a power-down ready mode in which the receiver receives a power-down ready signal when operating in normal mode, the control logic circuit is to turn on the dummy buffer.

In a power-down mode in which the receiver receives the power-down signal, the control logic circuit may turn off the receiver and the plurality of amplifying buffers, turn on the dummy buffer, and connect the dummy buffer to the output terminal of each of the plurality of amplifying buffers.

In a wake-up mode in which the receiver stops receiving the power-down signal when operating in power down mode, the control logic circuit may turn on the plurality of amplifying buffers.

An example embodiment of the present disclosure is directed to a display device, including a gate driver block to generate gating signals based on a control signal, a source driver block including a plurality of source driver circuits, each of the plurality of source driver circuits to generate driving signals based on the control signal and an image data signal, and a display panel to display at least one of a user image and a non-display image based on the gating signals and the driving signals. The display panel includes at least one of a display area to be driven by a first source driver circuit group including one or more source driver circuits from among the plurality of source driver circuits, the display area to display the user image, a first non-display area to be driven by the first source driver circuit group, the first non-display area to display the user image or the non-display image, and a second non-display area driven by a second source driver circuit group including one or more source driver circuits, not included in the first source driver circuit group, from among the plurality of source driver circuits, the second non-display area to display the user image or the non-display image. Each of the plurality of source driver circuits includes a receiver to receive the control signal and the image data signal through an input terminal and a plurality of amplifying buffers, each of the plurality of amplifying buffers including an output terminal to output each of the driving signals, and a control logic circuit to control turn-off of at least one of the receiver and the plurality of amplifying buffers when the receiver receives a power-down signal included in the control signal. A source driver circuit not receiving the power-down signal from among the plurality of source driver circuits is to output first driving signals for displaying the user image. A source driver circuit receiving the power-down signal from among the plurality of source driver circuits is to output second driving signals, each of the second driving signals having a same voltage value as a non-display voltage for displaying the non-display image.

Each of the plurality of source driver circuits may further include a switching element to connect or disconnect a non-display voltage node, to which a voltage having a voltage value identical to the non-display voltage is applied, with the output terminal of each of the plurality of amplifying buffers, wherein, in each of the one or more source driver circuits included in the second source driver circuit group, the control logic circuit may turn off the plurality of amplifying buffers, and connect the non-display voltage node to the output terminal of each of the plurality of amplifying buffers.

Each of the plurality of source driver circuits may further include a signal detector to detect a signal provided through the input terminal, wherein, in each of the one or more source driver circuits included in the second source driver circuit group, the control logic circuit may turn off the receiver and turn on the receiver when the signal detector detects that the image data signal begins to be provided through the input terminal when the receiver is turned off.

The power-down signal may not be provided to the receiver of each of the one or more source driver circuits included in the first source driver circuit group and may be provided to the receiver of each of the one or more source driver circuits in the second source driver circuit group.

While the display panel receives first gating signals corresponding to the display area, the power-down signal may not be provided to the receiver of each of the one or more source driver circuits included in the first source driver circuit group, while the display panel receives second gating signals corresponding to the first non-display area, the power-down signal may be provided to the receiver of each of the one or more source driver circuits included in the first source driver circuit group, and the power-down signal may be provided to the receiver of each of the one or more source driver circuits in the second source driver circuit group.

An example embodiment of the present disclosure is directed to a source driver block, including a plurality of source driver circuits, wherein the plurality of source driver circuits are divided into a first source driver circuit group and a second source driver circuit group, each source driver circuit including a receiver to receive a control signal and an image data signal, and a plurality of amplifying buffers, each of the plurality of amplifying buffers including an output terminal to output a driving signal, the driving signal being generated based on the image data signal and the control signal, wherein, the first and second source driver circuit groups are to operate independently in at least one of a normal mode and a power-save mode in accordance with the control signal, and in the power-save mode, at least one of the receiver and the plurality of amplifying buffers of the source driver circuit are turned off.

The first source driver circuit group may drive a display area and a first non-display area overlapping the display area in a direction in which the driving signals are supplied, and a second source driver circuit group may drive a second non-display area.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
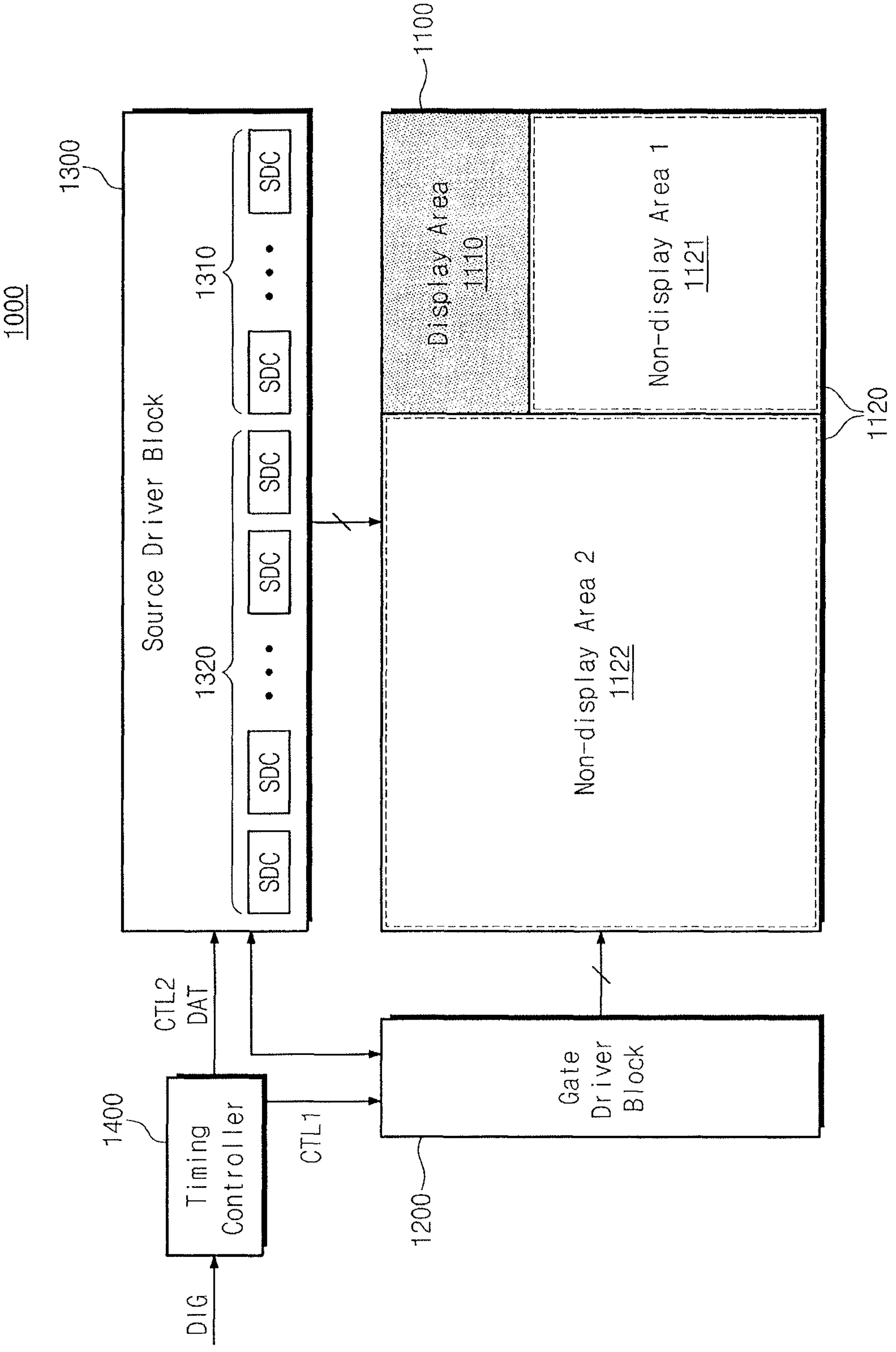
FIG. 1 illustrates a block diagram of a display device according to an example embodiment of the present disclosure.

Various embodiments of the present disclosure will be described in detail below with reference to the accompanying drawings. The present disclosure, however, may be embodied in various different forms, and should not be construed as being limited only to the illustrated embodiments. Rather, these embodiments are provided as examples so that this disclosure will be thorough and complete, and will fully convey the concept of the present disclosure to those skilled in the art. Accordingly, known processes, elements, and techniques are not described with respect to some of the embodiments of the present disclosure. Unless otherwise noted, like reference numerals denote like elements throughout the attached drawings and written description, and thus descriptions will not be repeated.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating a display device according to an example embodiment of the present disclosure. A display device 1000 may include a display panel 1100, a gate driver block 1200, a source driver block 1300, and a timing controller 1400. The display device 1000 may include other components not illustrated in FIG. 1 or may not include one or more of components illustrated in FIG. 1.

The display panel 1100 may display an image. The display panel 1100 may receive a gating signal from the gate driver block 1200. The display panel 1100 may receive a driving signal from a plurality of source driver circuits included in the source driver block 1300. The display panel 1100 may display an image based on the gating signal and the driving signal.

The gate driver block 1200 may include a gate driver circuit. The gate driver block 1200 may receive a first control signal CTL1 from the timing controller 1400. The gate driver circuit of the gate driver block 1200 may generate the gating signal based on the first control signal CTL1. The gating signal may be provided to the display panel 1100. An area of the display panel 1100 to which the driving signal is to be provided may be selected based on the gating signal.

The source driver block 1300 may include the plurality of source driver circuits. The source driver block 1300 may receive a second control signal CTL2 and an image data signal DAT from the timing controller 1400. The image data signal DAT may be a signal for transmitting information associated with an image to be displayed on the display panel 1100. Each of the source driver circuits may generate driving signals based on the second control signal CTL2 and the image data signal DAT. The driving signals may be provided to the display panel 1100. An image may be displayed on the display panel 1100 based on the driving signals.

The timing controller 1400 may control the gate driver block 1200 and the source driver block 1300. The timing controller 1400 may receive digital data DIG. The digital data DIG may be provided from another component included in the display device 1000. The timing controller 1400 may generate the first control signal CTL1, the second control signal CTL2, and the image data signal DAT based on the digital data DIG.

The timing controller 1400 may control output timings of the gating signal and the driving signal such that the display panel 1100 displays images appropriately. In order to achieve this, the timing controller 1400 may provide the first control signal CTL1, the second control signal CTL2, and the image data signal DAT to the gate driver block 1200 and the source driver block 1300. Further, the source driver block 1300 may exchange signals with the gate driver block 1200 such that the display panel 1100 displays images appropriately.

The gate driver circuit of the gate driver block 1200, the source driver circuits of the source driver block 1300, and the timing controller 1400 may communicate with each other in compliance with various sorts of interface protocols. For instance, the gate driver circuit, the source driver circuits, and the timing controller 1400 may communicate with each other with using one or more of a low voltage differential signaling (LVDS) interface, a multipoint-LVDS (M-LVDS) interface, a mini-LVDS interface, a low voltage positive/pseudo emitter coupled logic (LVPECL) interface, a current mode logic (CML) interface, a voltage mode logic (VML) interface, an advanced intra panel interface (AIPI), and a high definition multimedia interface (HDMI). However, the present disclosure is not limited thereto. The gate driver circuit, the source driver circuits, and the timing controller 1400 may communicate with each other based on other interface protocols that are not mentioned above.

As an example embodiment, the display device 1000 may perform a "partial display" function in which visual information to be provided to a user is displayed on a partial area of the display panel 1100. For example, a user of the display device 1000 may not watch broadcasting and may see weather, news, or a clock. For another example, the broadcasting may be only displayed on a partial area of the display panel 1100. In this example embodiment, the display panel 1100 may include a display area 1110 and a non-display area 1120.

The display area 1110 may display visual information to be provided to the user. Below, an image displayed on the display area 1110 will be referred to as a "user image". The display area 1110 may be driven by a first source driver circuit group 1310. The first source driver circuit group 1310 may include one or more source driver circuits from among the plurality of source driver circuits. While the user image is being displayed on the display area 1110, the one or more source driver circuits included in the first source driver circuit group 1310 may output driving signals for displaying the user image.

The non-display area 1120 may not display the visual information to be provided to the user. However, even when not displaying the user image, the non-display area 1120 may display an image for discriminating between the display area 1110 and the non-display area 1120. Below, an image displayed on the non-display area 1120 will be referred to as "non-display image". For instance, the non-display image may be a black image or a blue image, but the present disclosure is not limited thereto. The non-display area 1120 may display any one of images for discriminating between the display area 1110 and the non-display area 1120, as the non-display image. For instance, the non-display area 1120 may include a first non-display area 1121 and a second non-display area 1122.

The first non-display area 1121 may be driven by the first source driver circuit group 1310, as the first non-display area 1121 and the display area 1110 overlap in a direction in which the driving signals are supplied from the source driver block 1300. The first non-display area 1121 may display the user image or may display the non-display image (i.e., may not display the user image). The source driver circuits included in the first source driver circuit group 1310 may output driving signals for displaying the non-display image while the non-display image is being displayed on the first non-display area 1121. While the user image is being displayed on the first non-display area 1121, the one or more source driver circuits included in the first source driver circuit group 1310 may output driving signals for displaying the user image.

The second non-display area 1122 may be driven by a second source driver circuit group 1320. The second source driver circuit group 1320 may include one or more source driver circuits, which are not included in the first source driver circuit group 1310, from among the plurality of source driver circuits. The second non-display area 1122 may display the user image or the non-display image (i.e., may not display the user image). The source driver circuits included in the second source driver circuit group 1320 may output driving signals for displaying the non-display image while the non-display image is being displayed on the second non-display area 1122. While the user image is being displayed on the second non-display area 1122, the one or more source driver circuits included in the second source driver circuit group 1320 may output driving signals for displaying the user image.

In some cases, the display panel 1100 may not include at least one of the display area 1110, the first non-display area 1121, and the second non-display area 1122. For instance, when there is no user image to be displayed, the display panel 1100 may not include the display area 1110 and the first non-display area 1121. For another instance, when a height of the user image is longer than a width thereof, the display panel 1100 may not include the first non-display area

1121. Further, each of positions of the display area 1110, the first non-display area 1121, and the second non-display area 1122 may be changed. In addition, each of sizes of the display area 1110, the first non-display area 1121, and the second non-display area 1122 may be adjusted. FIG. 1 is an example to help understanding the present disclosure, and the present disclosure is not limited thereto.

When the second non-display area 1122 does not display the user image, the one or more source driver circuits included in the second source driver circuit group 1320 may not process data including information associated with the user image. Further, when the first non-display area 1121 does not display the user image, the one or more source driver circuits included in the first source driver circuit group 1310 may not process data including information associated with the user image while the non-display image is being displayed on the first non-display area 1121. Thus, the source driver circuits for driving the non-display area 1120 may not continue to operate fully.

According to an example embodiment of the present disclosure, operations of the source driver circuits of the source driver block 1300 or driving the non-display area 1120 may be controlled. According to an example embodiment of the present disclosure, power consumed by the source driver circuits for driving the non-display area 1120 may be reduced. A configuration and operations of a source driver circuit according to an example embodiment of the present disclosure will be more fully described with reference to FIGS. 2 to 24.

Figure 2:
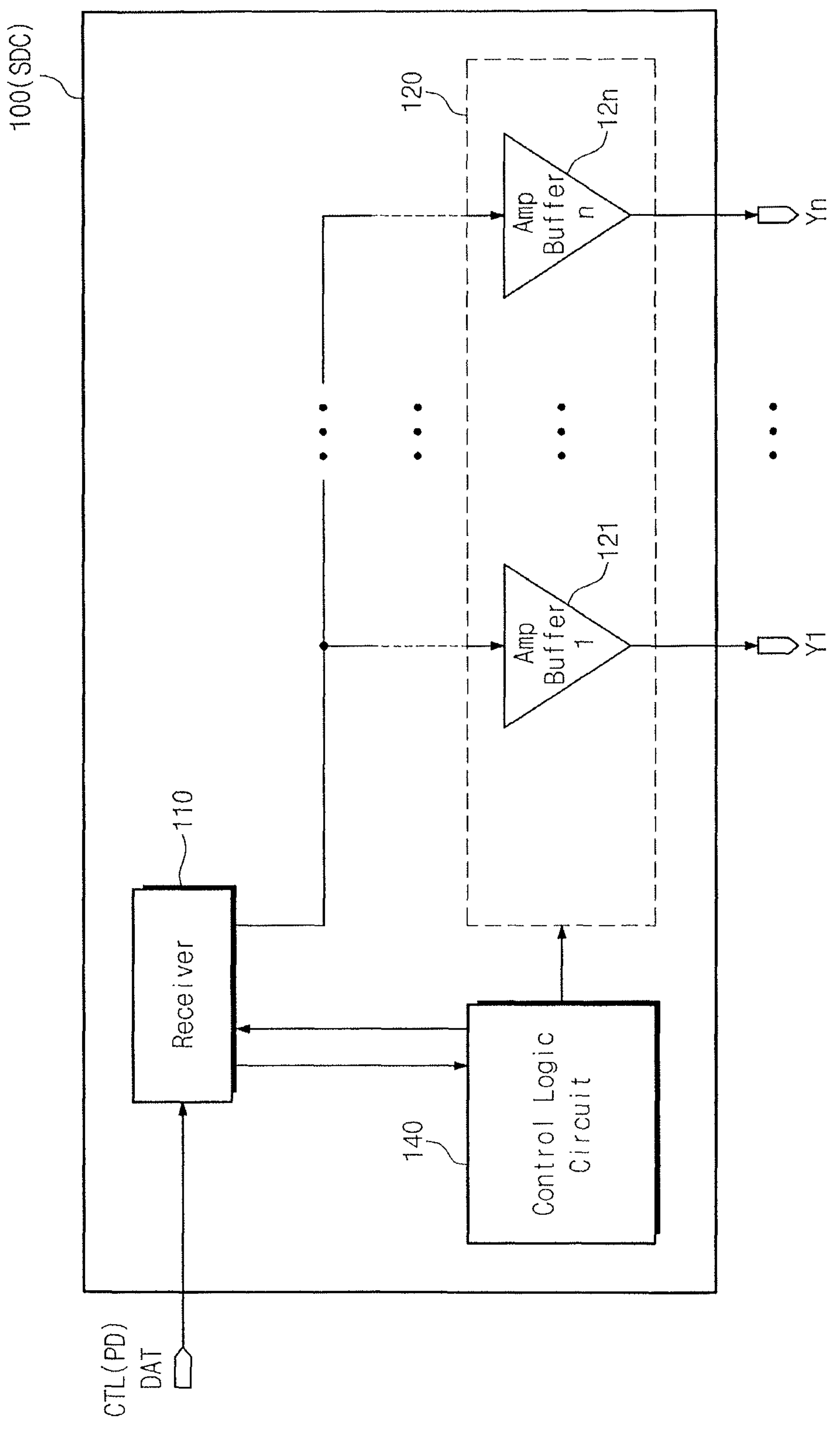
FIG. 2 illustrates a block diagram of a source driver circuit shown in FIG. 1.

FIG. 2 is a block diagram illustrating a source driver circuit shown in FIG. 1. A source driver circuit 100 may include a receiver 110, an amplifying buffer block 120, and a control logic circuit 140. The source driver circuit 100 may generate driving signals Y1 to Yn based on a control signal CTL and an image data signal DAT.

The receiver 110 may receive various kinds of signals through an input terminal. The receiver 110 may receive various kinds of signals from other components (e.g., a timing controller 1400 in FIG. 1) of a display device 1000 (refer to FIG. 1). The receiver 110 may receive the control signal CTL and the image data signal DAT through the input terminal. As an example embodiment, the receiver 110 may provide the received control signal CTL to the control logic circuit 140. As an example embodiment, the receiver 110 may provide the received image data signal DAT to a plurality of driver cells.

As an example embodiment, the receiver 110 may receive a single-level signal. As another example embodiment, the receiver 110 may receive a differential signal. When the receiver 110 receives a differential signal, the reliability of the control signal CTL and the image data signal DAT may be improved.

The amplifying buffer block 120 may include a first amplifying buffer 121 to an N-th amplifying buffer **12*n*. In FIG. 2, it is illustrated that the amplifying buffer block 120 includes "N" amplifying buffers. However, the present disclosure is not limited thereto. For instance, the number of amplifying buffers included in the amplifying buffer block 120** may be changed or modified.

Each of the amplifying buffers included in the amplifying buffer block 120 may output a driving signal generated based on the image data signal DAT. For instance, the first amplifying buffer 121 may output a first driving signal Y1, and the N-th amplifying buffer **12*n* may output an N-th driving signal Yn. Each of the amplifying buffers of the amplifying buffer block 120 may include an output terminal. Each amplifying buffer of the amplifying buffer block 120 may output the driving signal through its own output terminal. A display panel 1100 (refer to FIG. 1) may display images based on driving signals output from the amplifying buffer block 120**.

The amplifying buffer block 120 may be connected to signal channels. The signal channels may be used to transfer the driving signals to the display panel 1100. For instance, the first amplifying buffer 121 may be connected to a signal channel for transmitting the first driving signal Y1, and the N-th amplifying buffer **12*n* may be connected to a signal channel for transmitting the N-th driving signal Yn. As an example embodiment, the amplifying buffer block 120** may include as many amplifying buffers as signal channels.

The amplifying buffer block 120 may be included in driver cells. Each of the driver cells may generate a driving signal based on the image data signal DAT. One driver cell may output one driving signal through an output terminal of an amplifying buffer included therein. For instance, the first amplifying buffer 121 may be included in a driver cell for generating the first driving signal Y1, and the N-th amplifying buffer **12*n*** may be included in a driver cell for generating the N-th driving signal Yn. The driver cells may be respectively connected with the signal channels.

As an example embodiment, one driver cell may include a shift register to sequentially output bits of a bit string corresponding to the input image data signal DAT, a data latch to latch the bits output from the shift register, a level shifter to adjust signal levels corresponding to the bits latched by the data latch, a decoder to process gamma data based on the bits having the adjusted signal levels, and an amplifying buffer to output the gamma data as the driving signal. This example embodiment is only an example for describing one of possible embodiments. Change or modification on a configuration of the driver cell may be variously made.

As an example embodiment, the shift register, the data latch, the level shifter, and the decoder may be connected between the receiver 110 and the first amplifying buffer 121. The shift register, the data latch, the level shifter, and the decoder connected between the receiver 110 and the first amplifying buffer 121 may generate the first driving signal Y1 based on the image data signal DAT. Accordingly, the first amplifying buffer 121 may output the first driving signal Y1 generated based on the image data signal DAT.

Similarly, the N-th amplifying buffer **12*n* may output the N-th driving signal Yn generated by the shift register, the data latch, the level shifter, and the decoder connected between the receiver 110 and the N-th amplifying buffer 12*n***. This example embodiment is only an example for describing one of possible embodiments. Change or modification on an operation for generating the driving signals may be various made.

The control logic circuit 140 may manage and control the overall operations of the source driver circuit 100 based on the control signal CTL. The control logic circuit 140 may control operations of the receivers 110. The control logic circuit 140 may control operations of the amplifying buffers of the amplifying buffer block 120.

In an example embodiment, the receiver 110 may receive a power-down signal PD. For instance, the power-down signal PD may be an independent signal or may be included in another signal and may be provided to the source driver circuits, e.g., the source driver circuit groups, independently of one another. Herein, the term "power-down signal" does not intend to limit the present disclosure. For another instance, the power-down signal PD may be provided in the form of command through a separate line. Further, the power-down signal does not mean that the display itself, the entire source driver block, or even an individual source driver circuit 100 is completely turned-off, e.g., at least amplifying buffer in the source driver circuit may be turned off, but rather is to indicate a power saving mode. A method for transferring the power-down signal PD (or a power-down command) according to an example embodiment of the present disclosure may be variously changed or modified. As an example embodiment, the power-down signal PD may be included in the control signal CTL. This will be more fully described with reference to FIG. 3.

The power-down signal PD may be provided when the source driver circuit 100 drives a non-display area 1120 (refer to FIG. 1). The power-down signal PD may be a signal (or a command) for controlling operations of the source driver circuit 100 that drives the non-display area 1120. When the power-down signal PD is provided to the receiver 110, the control logic circuit 140 may control the operations of the source driver circuit 100 driving the non-display area 1120, thereby reducing power consumption.

When the power-down signal PD (or a power-down command) is provided to the receiver 110, the control logic circuit 140 may turn off one or more components based on the power-down signal PD. Herein, the term "turn-off" means that an operation of a specific component is interrupted. For instance, when one component includes one or more transistors, an operation of the component may be interrupted by turning off the transistors included therein. For another instance, an operation of one component may be interrupted when an operating voltage or a driving voltage is not supplied to the component. That is, the term "turn-off" mentioned below means that an operation of a specific component is interrupted to reduce power consumed by the specific component.

On the other hand, if the power-down signal PD (or a power-down command) provided to the receiver 110 is released, the control logic circuit 140 may turn on one or more components. Herein, the term "turn-on" means that a specific component begins to operate. Once one component is turned on, the component consumes power and performs its own function.

As an example embodiment, the control logic circuit 140 may make at least one of the receiver 110 and the amplifying buffers of the amplifying buffer block 120 turned off, based on the power-down signal PD (or a power-down command). Accordingly, power consumed by the source driver circuit 100 driving the non-display area 1120 may be reduced. Configurations and operations of the source driver circuit will be more fully described with reference to FIGS. 4 to 24.

As an example embodiment, the source driver circuit 100 may be implemented with an integrated circuit chip. The integrated circuit chip including the source driver circuit 100 may be packaged according to a variety of packaging technologies. Examples of such packaging technologies include package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), small outline integrated circuit (SOIC), shrink small outline package (SSOP), thin small outline package (TSOP), thin quad flat pack (TQFP), system in package (SIP), multi chip package (MCP), wafer-level fabricated package (WFP), and wafer-level processed stack package (WSP).

Figure 3:
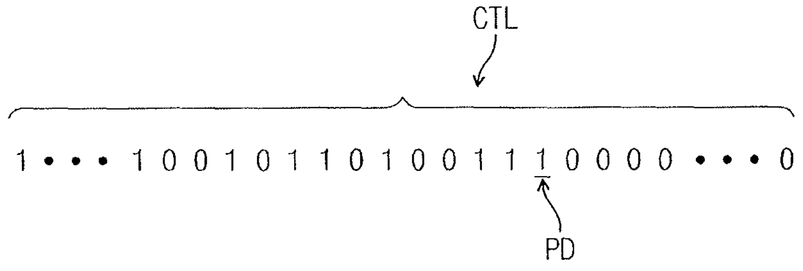
FIG. 3 illustrates a conceptual diagram describing a control signal and a power-down signal of FIG. 2.

FIG. 3 is a conceptual diagram describing a control signal and a power-down signal of FIG. 2. As described above, the receiver 110 (refer to FIG. 2) may receive a control signal CTL. The control logic circuit 140 (refer to FIG. 2) may manage and control the overall operations of a source driver circuit 100 (refer to FIG. 2) based on the control signal CTL.

The control signal CTL, e.g., may be provided in the form of an analog signal from a timing controller 1400 (refer to FIG. 1). For instance, the control signal CTL may be provided in the form of a single level signal or a differential signal. The receiver 110 may decode the control signal CTL to parse the control signal CTL. A bit stream corresponding to the control signal CTL may be obtained as the decoding result.

The bit stream corresponding to the control signal CTL may include one or more bits. The one or more bits may include different kinds of control information according to a bit position. For instance, the first and second bits of the bit stream may include header information, the third to sixth bits may include transmission characteristic information, and the seventh to tenth bits may include timing information for displaying a frame of image. However, this example is provided to help understanding the present disclosure and does not limit the present disclosure. Control information of the one or more bits may be variously changed or modified according to an interface manner employed by the receiver 110.

Each of the one or more bits of the bit stream corresponding to the control signal CTL may have a logical value of "1" or "0". An operation of the control logic circuit 140 may vary with a logical value of each of the one or more bits. For instance, the control logic circuit 140 may control a specific component when a specific bit has a logical value of "1", and the control logic circuit 140 may not control a specific component when a specific bit has a logical value of "0". This example is provided to help understanding the present disclosure and does not limit the present disclosure.

As an example embodiment, the control signal CTL may include a power-down signal PD. For instance, one of the bits included in the bit stream corresponding to the control signal CTL may have power-down information. A bit including the power-down information with a logical value of "1" may mean that the power-down signal PD is provided. A bit including the power-down information following the power-down information bit having a logical value of "1" with a logical value of "0" may mean that the power-down signal PD is released.

The above-described embodiment is an example to help understanding of the present disclosure. Unlike the above description, the source driver circuit 100 may be designed such that the event where a bit including the power-down information has a logical value of "0" means that the power-down signal PD is provided. Further, unlike the above description, two or more bits may include the power-down information. For instance, a value of two bits including the power-down information of "10" may mean that the power-down signal PD is provided, and a value of two bits including the power-down information of "01" may mean that the power-down signal PD is not provided. An embodiment of the present disclosure may be variously modified or changed.

FIG. 3 does not limit the present disclosure. The power-down signal PD (or a power-down command) may be an independent signal provided separately from the control signal CTL. Alternatively, the power-down signal PD may be provided in the form of a command through a separate line. FIG. 3 shows one of possible embodiments for the power-down signal.

Below, the control signal CTL is to include the power-down signal PD. Further, whether the power-down signal PD is provided or released is determined based on a logical value of a predetermined number of bits, e.g., one bit, included in the bit stream corresponding to the control signal CTL. In particular, when the one bit has a logical value of "1" means that the power-down signal PD is provided and when the one bit has a logical value of "0" means that the power-down signal PD is not provided. However, the above assumption is provided to help understanding, but not to limit, the present disclosure.

Figure 4:
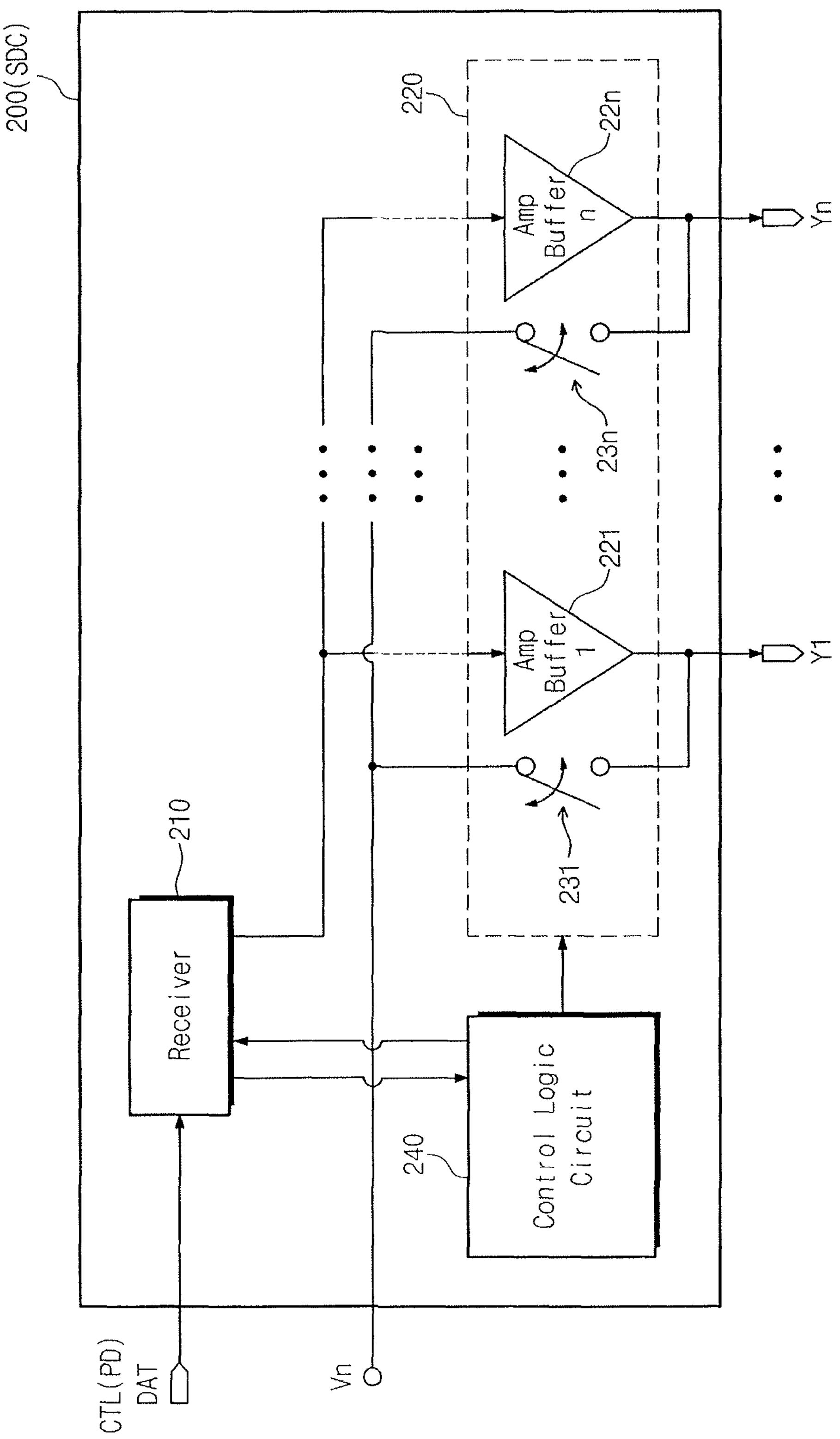
FIG. 4 illustrates a block diagram of a source driver circuit shown in FIG. 1.

FIG. 4 is a block diagram illustrating a source driver circuit shown in FIG. 1. A source driver circuit 200 may include a receiver 210, an amplifying buffer and switching element block 220, and a control logic circuit 240. The source driver circuit 200 may generate driving signals Y1 to Yn based on a control signal CTL and an image data signal DAT.

Configurations and functions of the receiver 210, amplifying buffers 221 to 22*n*, and the control logic circuit 240 may include configurations and functions of a receiver 110, amplifying buffers 121 to 12*n*, and a control logic circuit 140 of FIG. 2, and redundant descriptions thereof will be omitted below for brevity of the description.

As an example embodiment, the amplifying buffer and switching element block 220 of the source driver circuit 200 may include first to N-th switching elements 231 to 23*n*. In FIG. 4, it is illustrated that the amplifying buffer and switching element block 220 includes N switching elements. However, the number of switching elements included in the amplifying buffer and switching element block 220 may be modified or changed. FIG. 4 does not limit the present disclosure.

The plurality of switching elements may correspond to a plurality of amplifying buffers. For instance, the first switching element 231 may correspond to the first amplifying buffer 221, and the N-th switching element 23*n* may correspond to the N-th amplifying buffer 22*n*.

A first end of each of the switching elements may be connected with an output terminal of a corresponding one of the amplifying buffers. For instance, one end of the first switching element 231 may be connected with an output terminal of the first amplifying buffer 221, and a first end of the N-th switching element 23*n* may be connected to an output terminal of the N-th amplifying buffer 22*n*.

The second end of each of the switching elements may be connected with a non-display voltage node. The non-display voltage node may be a node to which a non-display voltage Vn is applied. The non-display voltage Vn may have a voltage value for driving a non-display area 1120 (refer to FIG. 1). For instance, when a non-display image displayed on the non-display area 1120 is a black image, the non-display voltage Vn may have a voltage value for outputting the black image to a display panel 1100 (refer to FIG. 1). However, the present disclosure is not limited thereto. As an example embodiment, the non-display voltage Vn may be provided from a power management circuit separately provided from the source driver circuit 200.

Each of the switching elements may be connected between the non-display voltage node and the corresponding one of the amplifying buffers. Each of the switching elements may connect or disconnect the non-display voltage node with the corresponding one of the amplifying buffers. For instance, the first switching element 231 may connect or disconnect the non-display voltage node with the output terminal of the first amplifying buffer 221, and the N-th switching element 23*n* may connect or disconnect the non-display voltage node with the output terminal of the N-th amplifying buffer 22*n*.

As an example embodiment, the control logic circuit 240 may control the switching elements based on a power-down signal PD (or a power-down command). The connection or disconnection between the non-display voltage node and the output terminals of the amplifying buffers may be controlled by the control logic circuit 240. Operations of the source driver circuit 200 according to a control of the control logic circuit 240 will be more fully described with reference to FIGS. 5 to 9.

Figure 5:
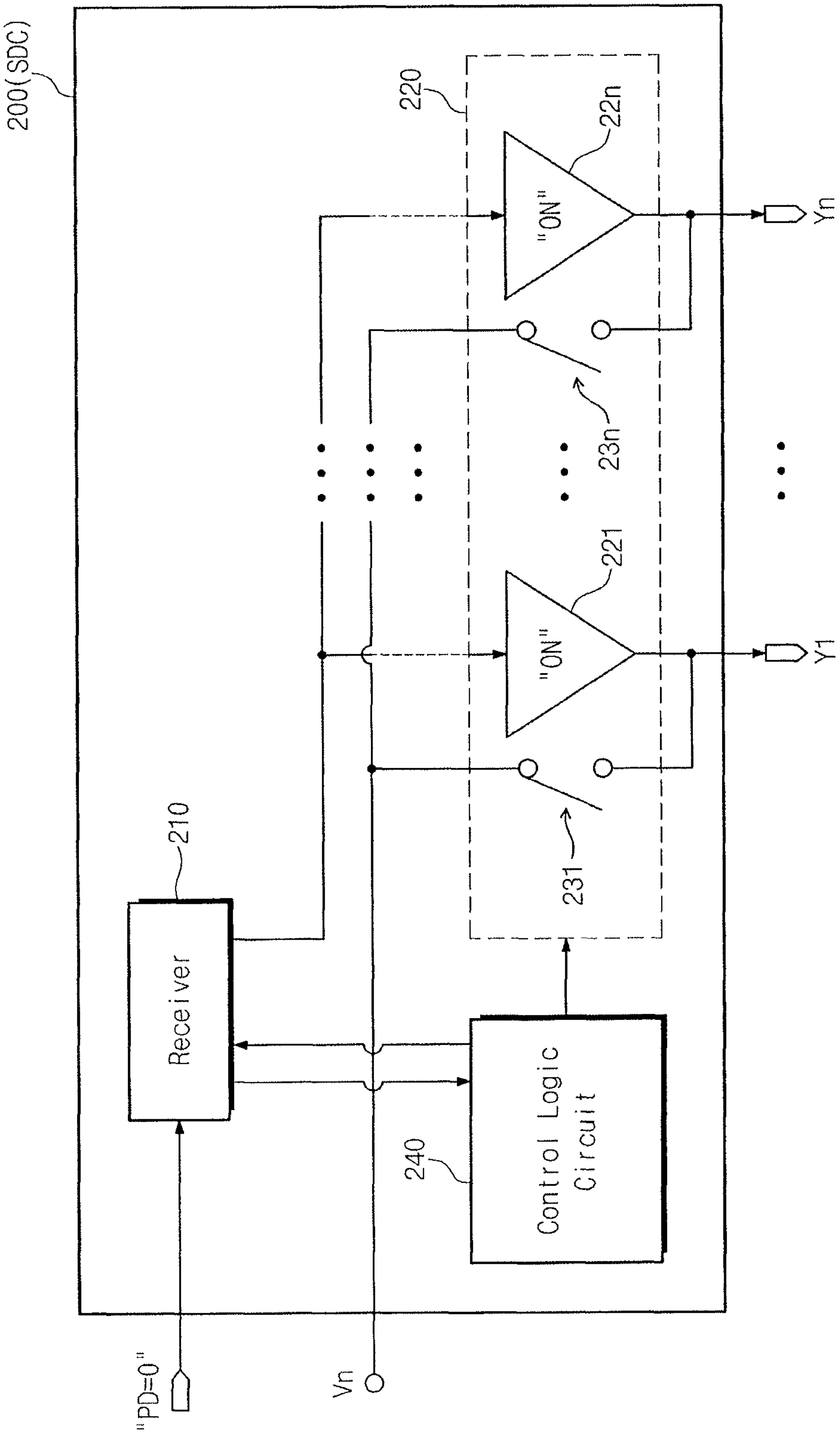
FIGS. 5 and 6 illustrate conceptual diagrams describing an operation of a source driver circuit of FIG. 4.
Figure 6:
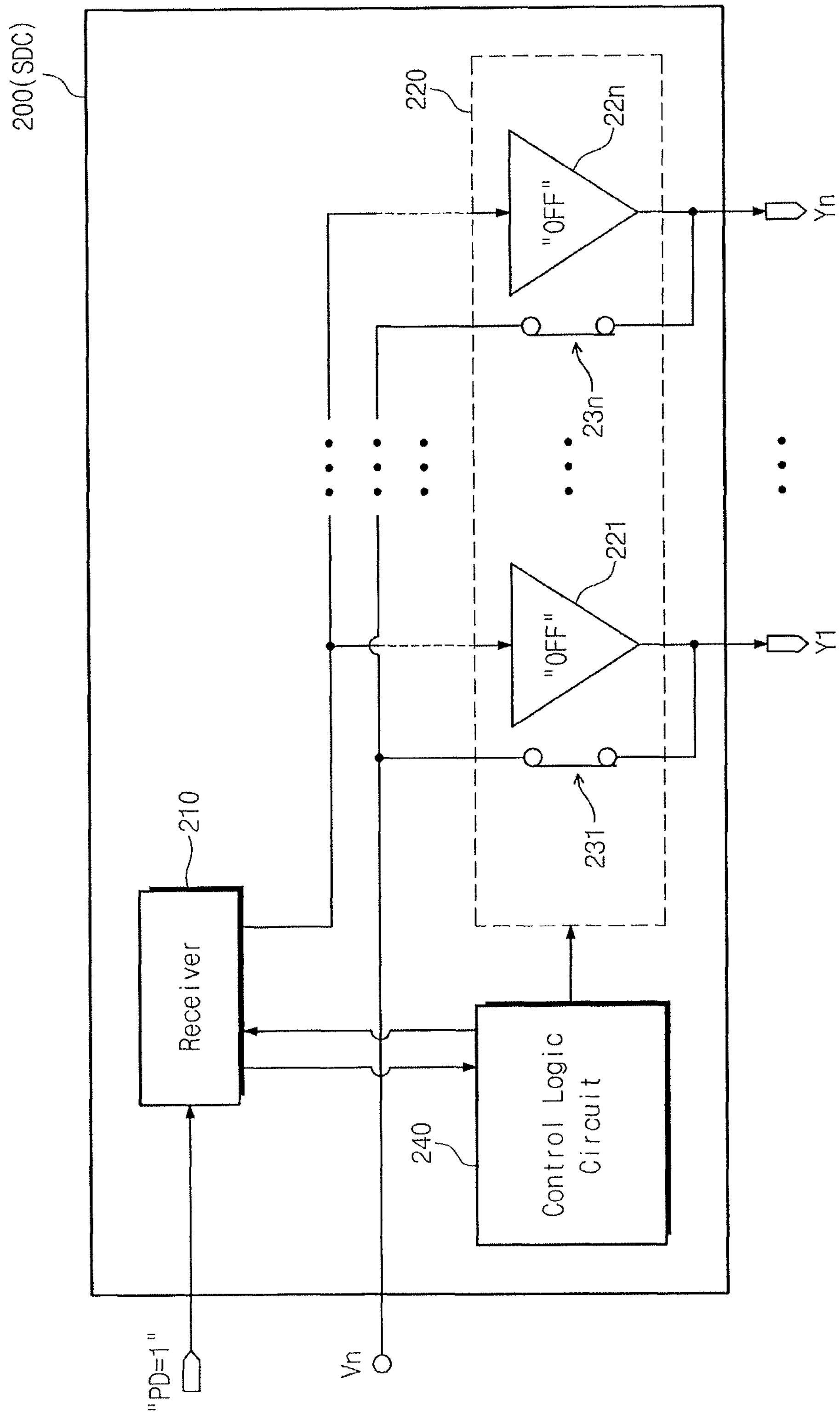

FIGS. 5 and 6 are conceptual diagrams describing operations of a source driver circuit of FIG. 4. FIG. 5 illustrates when a power-down signal PD is not provided to a source driver circuit 200 or the power-down signal PD provided to the source driver circuit 200 is released (i.e., when one bit including power-down information has a logical value of "0"). FIG. 6 illustrates when the power-down signal PD is provided to the source driver circuit 200 (i.e., when the one bit including the power-down information has a logical value of "1").

Referring to FIG. 5, when the source driver circuit 200 drives a display area 1110 (refer to FIG. 1), the power-down signal PD is not provided to a receiver 210 of the source driver circuit 200. When the power-down signal PD is not provided to the receiver 210, an operation corresponding to a "normal mode" is performed according to a control of a control logic circuit 240. The source driver circuit 200 driving the display area 1110 may operate in the normal mode according to the control of the control logic circuit 240.

In the normal mode, the control logic circuit 240 may turn on the receiver 210. Since the source driver circuit 200 drives the display area 1110, the receiver 210 may be turned on and may receive an image data signal DAT (refer to FIG. 4).

In the normal mode, the control logic circuit 240 may turn on amplifying buffers 221 to 22*n*. Since the source driver circuit 200 drives the display area 1110, the amplifying buffers 221 to 22*n* may be turned on and may output driving signals Y1 to Yn, respectively. Thus, a display panel 1100 (refer to FIG. 1) may display a user image in response to the driving signals Y1 to Yn.

In the normal mode, the control logic circuit 240 may open the switching elements 231 to 23*n*. Thus, output terminals of the amplifying buffers 221 to 22*n* may be disconnected from a non-display voltage node. Further, the source driver circuit 200 may output the driving signals Y1 to Yn for displaying the user image through the output terminals of the amplifying buffers 221 to 22*n*.

On the other hand, since a non-display area 1120 (refer to FIG. 1) does not display the user image, the source driver circuit 200 driving the non-display area 1120 may not process data including information associated with the user image. Thus, the source driver circuit 200 driving the non-display area 1120 needs not to continue to operate fully. It may be enough to output driving signals for outputting a non-display image for the source driver circuit 200 driving the non-display area 1120.

Referring to FIG. 6, when the source driver circuit 200 drives the non-display area 1120, the power-down signal PD may be provided to the receiver 210 of the source driver circuit 200. When the receiver 210 receives the power-down signal PD, the control logic circuit 240 may perform an operation corresponding to a "power-down mode". The source driver circuit 200 driving the non-display area 1120 may operate in the power-down mode according to the control of the control logic circuit 240.

In the power-down mode, the control logic circuit 240 may turn off the amplifying buffers 221 to 22*n*. The source driver circuit 200 driving the non-display area 1120 may not process data including information associated with the user image. Thus, turning off the amplifying buffers 221 to 22*n* does not affect display of the non-display image.

However, when the amplifying buffers 221 to 22*n* are just turned off, voltages of the output terminals of the amplifying buffers 221 to 22*n* may be biased or may fluctuate depending upon a condition or state of the source driver circuit 200. If the voltages of the output terminals of the amplifying buffers 221 to 22*n* are unstable, the non-display image may not be appropriately displayed on the non-display area 1120. The switching elements 231 to 23*n* may be used to solve the above problem.

In the power-down mode, the control logic circuit 240 may close the switching elements 231 to 23*n*. According to this, the output terminals of the amplifying buffers 221 to 22*n* may be connected with the non-display voltage node. Thus, the output terminals of the amplifying buffers 221 to 22*n* may output the driving signals Y1 to Yn that have the same voltage value as a non-display voltage Vn. As a result, the source driver circuit 200 may output the driving signals Y1 to Yn for displaying the non-display image through the output terminals of the amplifying buffers 221 to 22*n*.

According to an example embodiment of the present disclosure, the amplifying buffers 221 to 22*n* of the source driver circuit 200 driving the non-display area 1120 may be turned off. Even though the amplifying buffers 221 to 22*n* are turned off, the source driver circuit 200 may output the driving signals Y1 to Yn for displaying the non-display image. The source driver circuit 200 that receives the power-down signal PD may consume the small amount of power, since the amplifying buffers 221 to 22*n* that consume a large amount of power in the source driver circuit 200 are turned off.

According to an example embodiment of the present disclosure, the source driver circuit 200 driving the non-display area 1120 may consume a small amount of power. Thus, according to an example embodiment of the present disclosure, power consumed by a display device to perform a partial display function may be markedly reduced.

Figure 7:
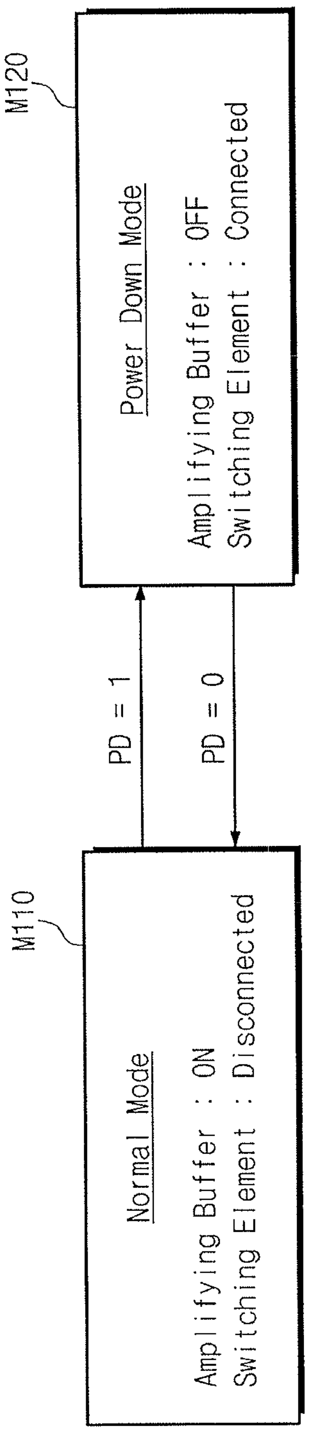
FIG. 7 illustrates a state diagram describing an operation of a source driver circuit of FIG. 4.

FIG. 7 is a state diagram describing an operation of the source driver circuit of FIG. 4. The source driver circuit 200 shown in FIG. 4 may operate in a normal mode M110 or a power-down mode M120. An operation corresponding to one of the normal mode M110 and the power-down mode M120 may be performed based on whether a power-down signal PD is provided (i.e., a logical value of a bit including power-down information).

When the power-down signal PD is not provided (i.e., when the bit including the power-down information has a logical value of "0"), an operation corresponding to the normal mode M110 may be performed. In the normal mode M110, a control logic circuit 240 (refer to FIG. 4) may turn on amplifying buffers 221 to 22*n* (refer to FIG. 4). Further, in the normal mode, the control logic circuit 240 may disconnect output terminals of the amplifying buffers 221 to 22*n* from a non-display voltage node. Thus, the source driver circuit 200 may output driving signals for displaying a user image. When the power-down signal PD is provided in the normal mode M110, an operating mode of the source driver circuit 200 may transition from the normal mode M110 to the power-down mode M120.

When the power-down signal PD is provided (i.e., when the bit including the power-down information has a logical value of "1"), an operation corresponding to the power-down mode M120 may be performed. In the power-down mode M120, the control logic circuit 240 may turn off the amplifying buffers 221 to 22*n*. Further, in the power-down mode M120, the control logic circuit 240 may connect the output terminals of the amplifying buffers 221 to 22*n* to the non-display voltage node. Thus, the source driver circuit 200 may consume a small amount of power and may output driving signals for displaying a non-display image. When the power-down signal PD is released in the power-down mode M120, an operating mode of the source driver circuit 200 may transition from the power-down mode M120 to the normal mode M110.

Figure 8:
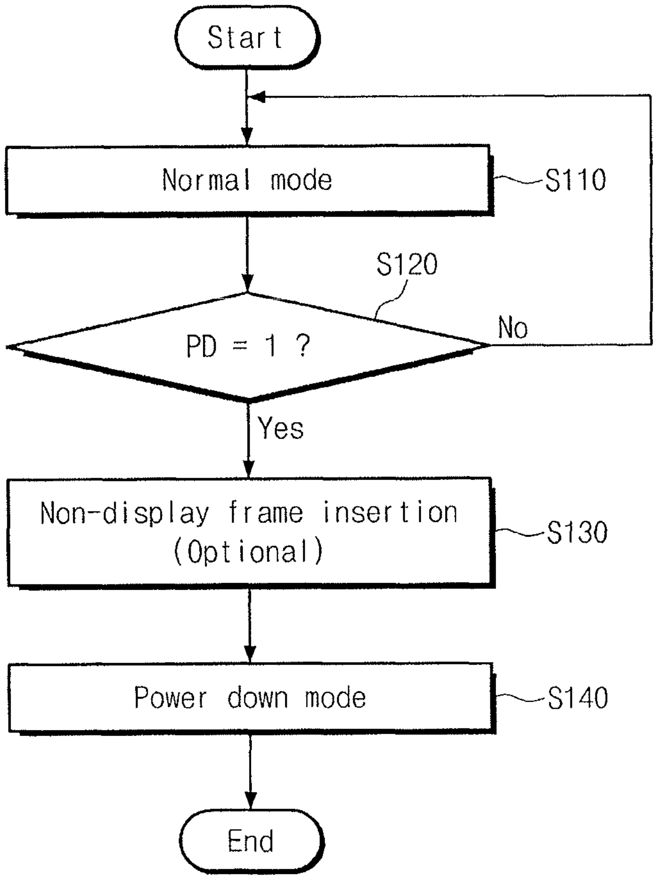
FIGS. 8 and 9 illustrate flowcharts describing an operation of a source driver circuit of FIG. 4.
Figure 9:
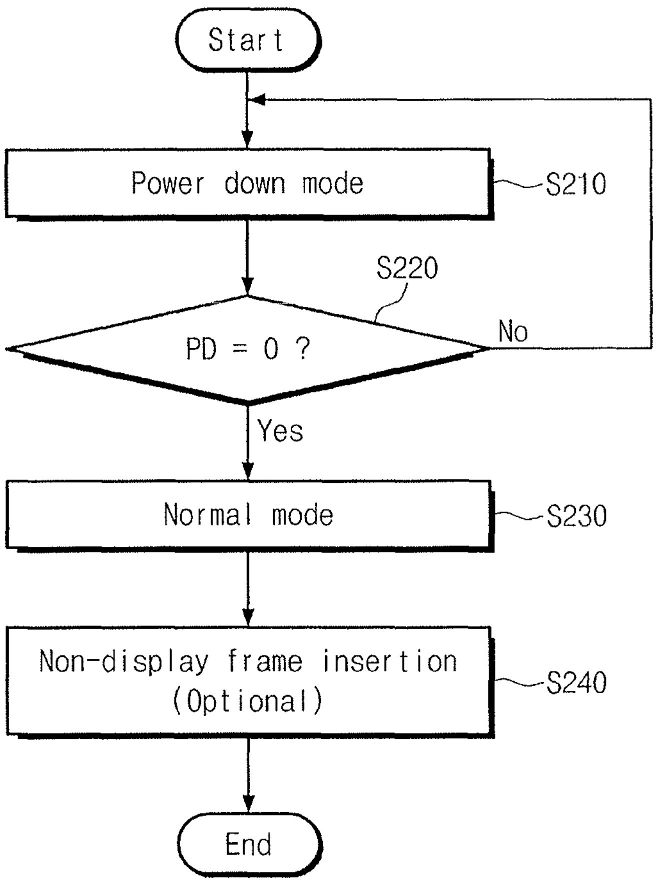

FIGS. 8 and 9 are flowcharts describing an operation of a source driver circuit of FIG. 4. FIG. 8 shows the case where an operating mode of a source driver circuit 200 of FIG. 4 transitions from a normal mode to a power-down mode. FIG. 9 shows the case where an operating mode of the source driver circuit 200 transitions from the power-down mode to the normal mode.

Referring to FIG. 8, in operation S110, an operation corresponding to the normal mode may be performed. In the normal mode, the source driver circuit 200 may drive a display area 1110 (refer to FIG. 1). In the normal mode, the control logic circuit 240 (refer to FIG. 4) may turn on amplifying buffers 221 to 22*n* (refer to FIG. 4). Further, in the normal mode, the control logic circuit 240 (refer to FIG. 4) may disconnect output terminals of the amplifying buffers 221 to 22*n* from a non-display voltage node.

In operation S120, a power-down signal PD, e.g., having a value of 1, may be provided to the receiver 210 (refer to FIG. 4). When the power-down signal PD is not provided, the source driver circuit 200 may continue to operate in the normal mode. When the power-down signal PD is provided, the method may proceed to operation S130.

In operation S130, as an example embodiment, a "non-display frame" may be inserted. The non-display frame may be inserted to temporarily output driving signals of which each has the same voltage value as a non-display voltage for driving a non-display area 1120 (refer to FIG. 1) before the amplifying buffers 221 to 22*n* are turned off.

Before the power-down signal PD is provided, the amplifying buffers 221 to 22*n* may output driving signals of which each has a voltage value for displaying a user image. Then, after the power-down signal PD is provided, the amplifying buffers 221 to 22*n* may be turned off, and output terminals of the amplifying buffers 221 to 22*n* may be connected to the non-display voltage node. If a difference between voltage values of the driving signals output by the amplifying buffers 221 to 22*n* just before the power-down signal PD is provided and a voltage value of the non-display voltage is large, output of the non-display image may be delayed. Accordingly, as an example embodiment, instead of just connecting the output terminals of the amplifying buffers 221 to 22*n* with the non-display voltage node, driving signals having the same voltage value as the non-display voltage may be temporarily output through the amplifying buffers 221 to 22*n*, thereby improving a response speed of a display panel 1100 (refer to FIG. 1) and displaying the non-display image appropriately.

That is, in operation S130, the amplifying buffers 221 to 22*n* may output driving signals of which each has the same voltage value as the non-display voltage during a predetermined time. The non-display frame may be inserted during the predetermined time which is required to display the non-display image appropriately. The insertion time of the non-display frame (i.e., a time interval when the non-display frame is displayed) may be variously selected. As an example embodiment, the insertion time of the non-display frame may be fixed or adjustable. Operation S130 may be performed after the power-down signal PD is provided and before the amplifying buffers 221 to 22*n* are turned off.

In operation S140, an operation corresponding to the power-down mode may be performed. In the power-down mode, the source driver circuit 200 may drive the non-display area 1120. In the power-down mode, the control logic circuit 240 may turn off the amplifying buffers 221 to 22*n*. Further, in the power-down mode, the control logic circuit 240 may connect the output terminals of the amplifying buffers 221 to 22*n* to the non-display voltage node.

Referring to FIG. 9, in operation S210, the operation corresponding to the power-down mode may be performed. In the power-down mode, the source driver circuit 200 may drive the non-display area 1120. In the power-down mode, the control logic circuit 240 may turn off the amplifying buffers 221 to 22*n*. Further, in the power-down mode, the control logic circuit 240 may connect the output terminals of the amplifying buffers 221 to 22*n* to the non-display voltage node.

In operation S220, the power-down signal PD provided in operation S120 (refer to FIG. 8) may be released, e.g., returns to 0. When the power-down signal PD continues to be provided, the source driver circuit 200 may continue to operate in the power-down mode. When the power-down signal PD is released the method may proceed to operation S230.

In operation S230, the operation corresponding to the normal mode may be performed. In the normal mode, the source driver circuit 200 may drive the display area 1110. In the normal mode, the control logic circuit 240 may turn on the amplifying buffers 221 to 22*n*. Further, in the normal mode, the control logic circuit 240 may disconnect the output terminals of the amplifying buffers 221 to 22*n* from the non-display voltage node.

In operation S240, as an example embodiment, the non-display frame may be inserted. The amplifying buffers 221 to 22*n* may output driving signals of which each has the same voltage value as the non-display voltage for driving the non-display area 1120, during a set time after the amplifying buffers 221 to 22*n* are turned on. As described with reference to FIG. 8, driving signals having the same voltage value as the non-display voltage may be temporarily output through the amplifying buffers 221 to 22*n*, thereby improving a response speed of the display panel 1100 and displaying the non-display image appropriately.

Figure 10:
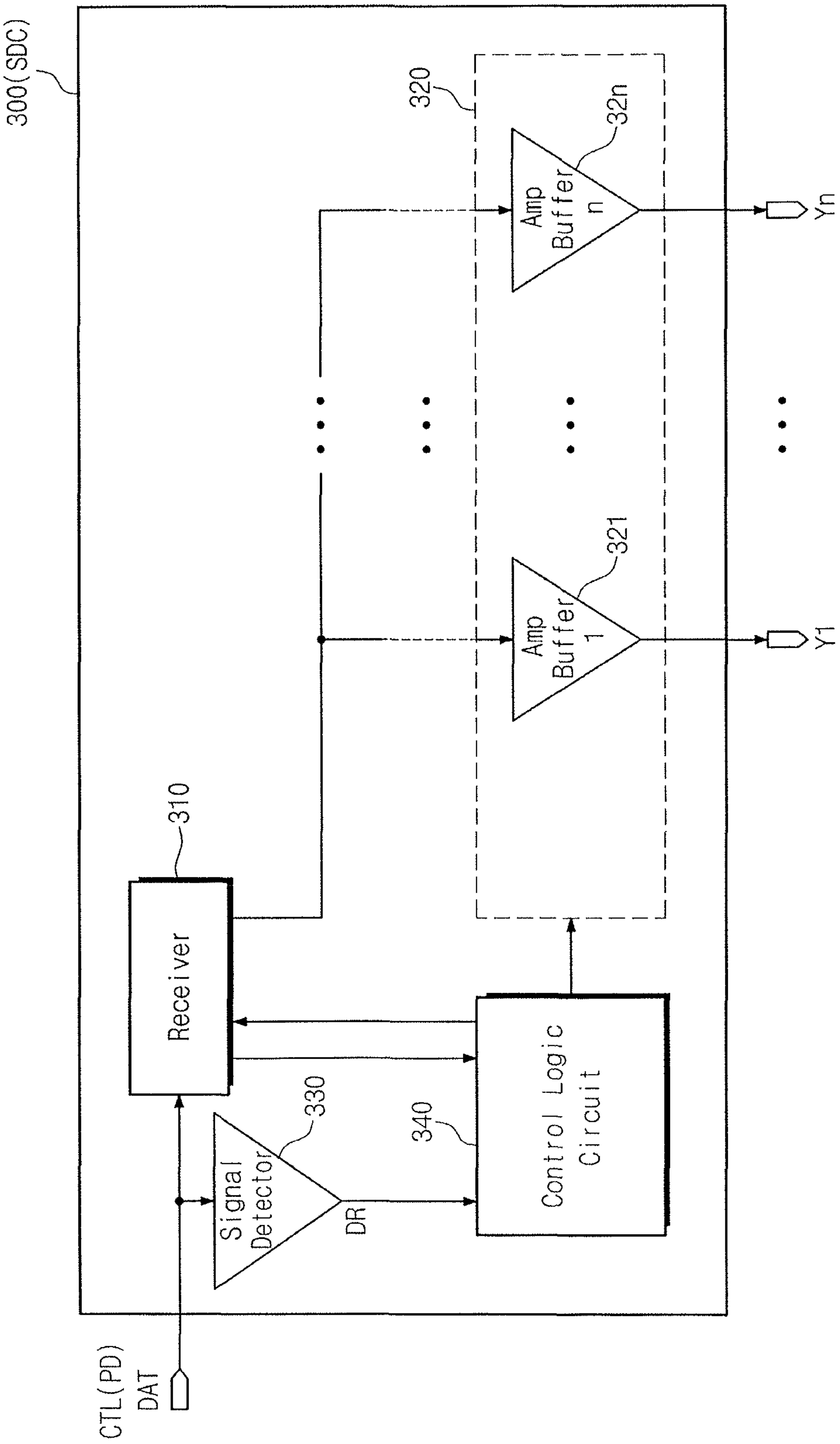
FIG. 10 illustrates a block diagram of a source driver circuit shown in FIG. 1 according to an example embodiment of the present disclosure.

FIG. 10 is a block diagram illustrating a source driver circuit shown in FIG. 1 according to an example embodiment of the present disclosure. A source driver circuit 300 may include a receiver 310, an amplifying buffer block 320, a signal detector 330, and a control logic circuit 340. The source driver circuit 300 may generate driving signals Y1 to Yn based on a control signal CTL and an image data signal DAT.

Configurations and functions of the receiver 310, amplifying buffers 321 to 32*n* of the amplifying buffer block 320, and the control logic circuit 340 may include those of a receiver 110, amplifying buffers 121 to 12*n* of an amplifying buffer block 120, and a control logic circuit 140 of FIG. 2, thus, redundant descriptions thereof will be omitted below for brevity of the description.

As an example embodiment, the source driver circuit 300 may include the signal detector 330. The signal detector 330 may detect a signal provided through an input terminal. The signal detector 330 may output a detection result DR corresponding to the detected signal.

As an example embodiment, the control logic circuit 340 may control operations of other components included in the source driver circuit 300 based on a control signal CTL, in particular, a power-down signal PD (or a power-down command). Further, the control logic circuit 340 may control operations of other components included in the source driver circuit 300 based on the detection result DR (i.e., the signal detected by the signal detector 330). As an example embodiment, the control logic circuit 340 may control turn-on or turn-off the receiver 310 based on the detection result DR. Operations of the source driver circuit 300 according to a control of the control logic circuit 340 will be more fully described with reference to FIGS. 11 to 14.

Figure 11:
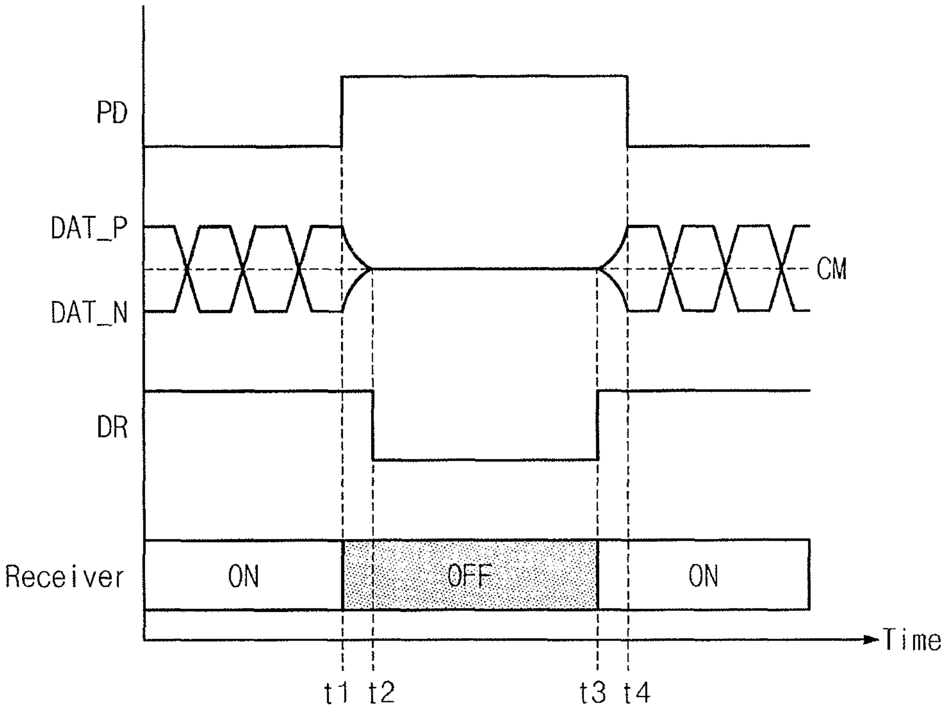
FIG. 11 illustrates a timing diagram describing an operation of a source driver circuit of FIG. 10.

FIG. 11 is a timing diagram describing an operation of a source driver circuit of FIG. 10.

Before time "t1", a power-down signal PD may be not provided to a receiver 310 (refer to FIG. 10) (i.e., a bit including power-down information has a logical value of "0"). Before the time "t1", a source driver circuit 300 (refer to FIG. 10) may drive a display area 1110 (refer to FIG. 1). Thus, a differential data signal DAT_P and DAT_N (e.g., an image data signal DAT (refer to FIG. 10)) may be provided to the receiver 310. Herein, it is assumed that the "differential" data signal is provided to the receiver 310. However, this assumption, is provided to help understanding, but not to limit, the present disclosure.

Because the differential data signal DAT_P and DAT_N is provided before time "t1", a signal detector 330 (refer to FIG. 10) may detect that a signal is provided through an input terminal. The signal detector 330 may output a detection result DR. As an example embodiment, when a signal is provided through the input terminal, the detection result DR may have a logical value of "1". The receiver 310 may be turned on to receive the differential data signal DAT_P and DAT_N before time "t1".

For instance, the power-down signal PD may be provided to the receiver 310 at time "t1" (i.e., the bit including the power-down information has a logical value of "1"). After time "t1", the source driver circuit 300 may drive the non-display area 1120 (refer to FIG. 1). The source driver circuit 300 may not process data including information associated with a user image when the source driver circuit 300 drives the non-display area 1120. Thus, as an example embodiment, when the power-down signal PD is provided, the control logic circuit 340 (refer to FIG. 10) may turn off the receiver 310. In addition, when the power-down signal PD is provided, a level of the differential data signal DAT_P and DAT_N may gradually approach to a common mode level CM.

For instance, at time "t2", the level of the differential data signal DAT_P and DAT_N may reach the common mode level CM. In this case, the signal detector 330 may detect that a signal is not provided through the input terminal. As an example embodiment, when a signal is not provided through the input terminal, the signal detector 330 may output the detection result DR having a logical value of "0".

For instance, the differential data signal DAT_P and DAT_N (e.g., the image data signal DAT) may begin to be provided at time "t3". At time "t3", the signal detector 330 may detect that a signal is provided through the input terminal and may output the detection result DR having a logical value of "1". Since the differential data signal DAT_P and DAT_N is provided, the receiver 310 needs to be turned on again. The control logic circuit 340 may turn on the receiver 310 when the signal detector 330 detects that a signal begins to be provided through the input terminal with the receiver 310 being turned off.

Since the receiver 310 is turned on, the receiver 310 may receive the control signal CTL and the image data signal DAT. In particular, when the power-down signal PD is released at time "t4", the control logic circuit 340 may recognize that the power-down signal PD is released through the receiver 310. After time "t4", the source driver circuit 300 may drive the display area 1110.

According to an example embodiment of the present disclosure, the receiver 310 of the source driver circuit 300 driving the non-display area 1120 may be turned off. Thus, the source driver circuit 300 that receives the power-down signal PD may consume the small amount of power.

However, when the receiver 310 is turned off, the receiver 310 does not recognize whether the power-down signal PD is released or whether the image data signal DAT is provided. The signal detector 330 may be used to solve the above problem. Whether a signal is provided may be detected with using the signal detector 330. The receiver 310 may be turned on when providing a signal is detected by the signal detector 330.

Thus, the source driver circuit 300 driving the non-display area 1120 may consume the small amount of power and may receive a signal appropriately. According to an example embodiment of the present disclosure, power consumed by a display device with a partial display function may be reduced.

An example embodiment of FIG. 11 does not limit the present disclosure. For instance, the detection result DR may be designed to have a logical value of "0" when a signal is provided through the input terminal. The detection result DR may be designed in various manners to indicate whether a signal is provided through the input terminal. For another instance, even though the differential data signal DAT_P and DAT_N does not have the common mode level CM exactly, the signal detector 330 may detect that a signal is not provided through the input terminal. This issue relates to sensitivity of the signal detector 330.

For still another instance, the signal detector 330 may be designed to detect whether the differential data signal DAT_P and DAT_N has a specific level or whether the differential data signal DAT_P and DAT_N has a specific signal pattern, instead of the common mode level CM. The signal detector 330 and the detection result DR may be designed in various manners to determine timing of turn-off or turn-on of the receiver 310 appropriately. Further, an example embodiment of FIG. 11 has been described based on the differential data signal DAT_P and DAT_N, but the present disclosure may be applied to the case where a single level signal is provided.

That is, the present disclosure may be implemented differently from an example embodiment of FIG. 11. An example embodiment of FIG. 11 is provided to help understanding, but not to limit, the present disclosure.

Figure 12:
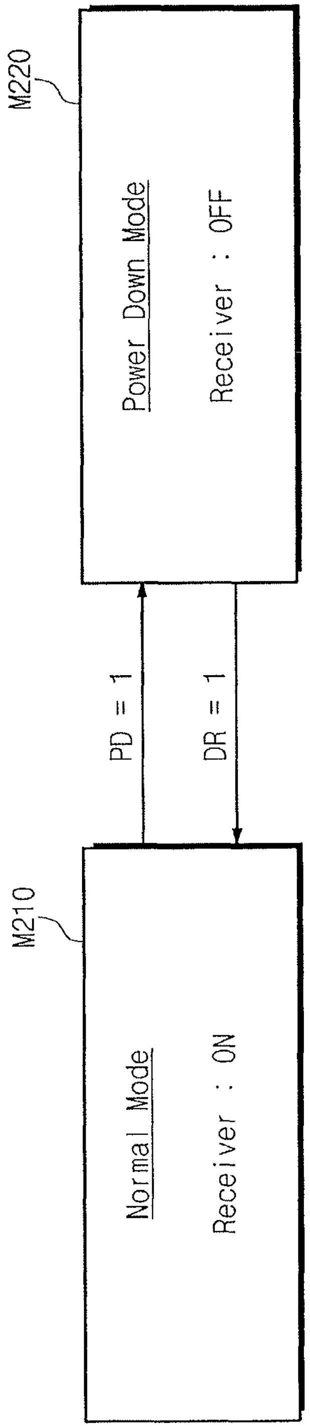
FIG. 12 illustrates a state diagram describing an operation of a source driver circuit of FIG. 10.

FIG. 12 is a state diagram describing an operation of a source driver circuit of FIG. 10. A source driver circuit 300 shown in FIG. 10 may operate in a normal mode M210 or a power-down mode M220. An operation corresponding to one of the normal mode M210 and the power-down mode M220 may be performed based on whether a power-down signal PD is provided (i.e., a logical value of a bit including power-down information) and a detection result DR of a signal detector 330 (refer to FIG. 10).

An operation corresponding to the normal mode M210 may be performed when the signal detector 330 detects a signal provided through an input terminal. In the normal mode M210, the control logic circuit 340 (refer to FIG. 10) may turn on the receiver 310 (refer to FIG. 10). Thus, the control signal CTL and the image data signal DAT may be provided to the receiver 310 through the input terminal. When the power-down signal PD is provided in the normal mode M210, an operating mode of the source driver circuit 300 may transition from the normal mode M210 to the power-down mode M220.

An operation corresponding to the power-down mode M220 may be performed when the power-down signal PD is provided. In the power-down mode M220, the control logic circuit 340 may turn off the receiver 310. The signal detector 330 may detect, for instance, whether the image data signal DAT is provided through the input terminal with the receiver 310 being turned off. When the signal detector 330 detects that a signal begins to be provided through the input terminal in the power-down mode M220, an operating mode of the source driver circuit 300 may transition from the power-down mode M220 to the normal mode M210.

Figure 13:
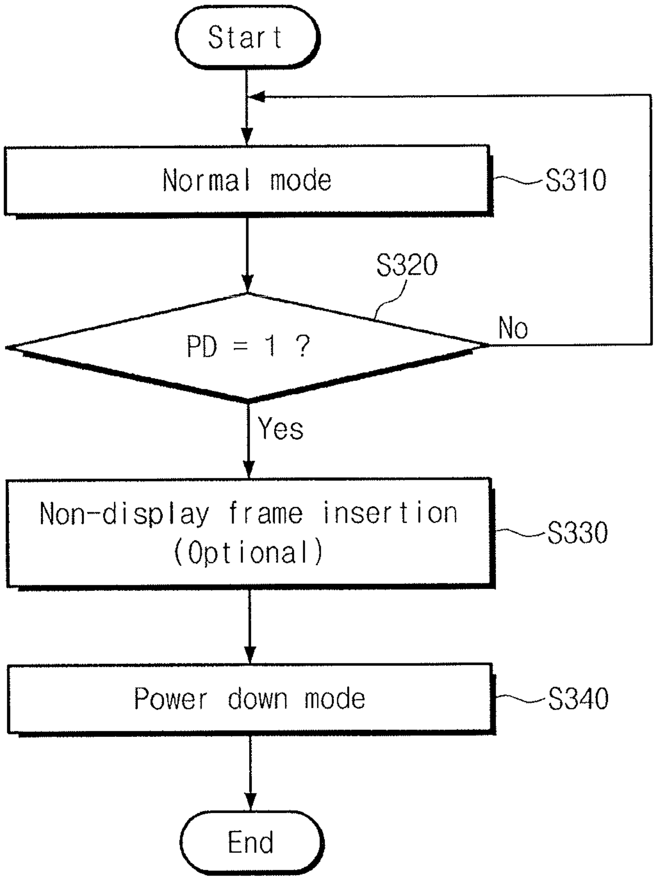
FIGS. 13 and 14 illustrate flowcharts describing an operation of a source driver circuit of FIG. 10.
Figure 14:
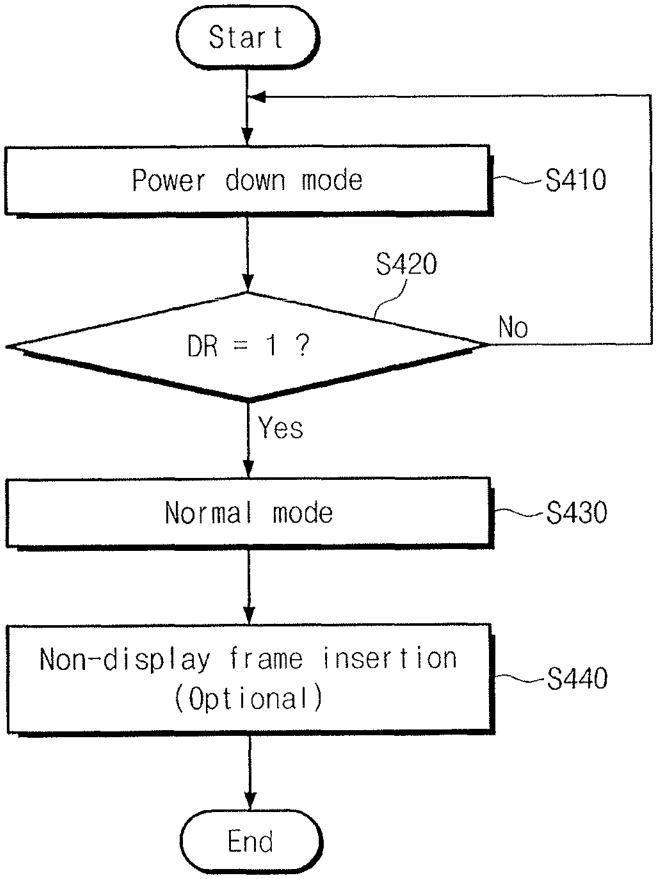

FIGS. 13 and 14 are flowcharts describing an operation of a source driver circuit of FIG. 10. FIG. 13 shows the case where an operating mode of a source driver circuit 300 of FIG. 10 transitions from a normal mode to a power-down mode. On the other hand, FIG. 14 shows the case where an operating mode of the source driver circuit 300 transitions from the power-down mode to the normal mode.

Referring to FIG. 13, in operation S310, an operation corresponding to the normal mode may be performed. In the normal mode, the source driver circuit 300 may drive a display area 1110 (refer to FIG. 1). In the normal mode, the control logic circuit 340 (refer to FIG. 10) may turn on the receiver 310 (refer to FIG. 10).

In operation S320, a power-down signal PD may be provided to the receiver 310. When the power-down signal PD is not provided, the source driver circuit 300 may continue to operate in the normal mode. On the other hand, when the power-down signal PD is provided, the method may proceed to operation S330.

In operation S330, as an example embodiment, a non-display frame may be inserted. Inserting the non-display frame has been described with reference to FIGS. 8 and 9. Driving signals of which each has the same voltage value as the non-display voltage may be temporarily output through amplifying buffers 321 to 32*n* (refer to FIG. 10) having a strong driving capability, thereby improving a response speed of the display panel 1100 (refer to FIG. 1) and making it possible to display a non-display image appropriately.

In operation S340, an operation corresponding to the power-down mode may be performed. In the power-down mode, the source driver circuit 300 may drive the non-display area 1120. In the power-down mode, the control logic circuit 340 may turn off the receiver 310 (refer to FIG. 10).

Referring to FIG. 14, in operation S410, an operation corresponding to the power-down mode may be performed. In the power-down mode, the source driver circuit 300 may drive the non-display area 1120. In the power-down mode, the control logic circuit 340 may turn off the receiver 310.

In operation S420, the signal detector 330 (refer to FIG. 10) may detect whether a signal is provided through an input terminal. When a signal is not provided through the input terminal, the source driver circuit 300 may continue to operate in the power-down mode. On the other hand, when the signal detector 330 detects that a signal begins to be provided through the input terminal, the method may proceed to operation S430.

In operation S430, an operation corresponding to the normal mode may be performed. In the normal mode, the source driver circuit 300 may drive the display area 1110. In the normal mode, the control logic circuit 340 may turn on the receiver 310.

In operation S440, as an example embodiment, the non-display frame may be inserted according to a manner described with reference to FIGS. 8 and 9. Driving signals of which each has the same voltage value as the non-display voltage may be temporarily output through the amplifying buffers 321 to 32*n* having a strong driving capability, thereby improving a response speed of the display panel 1100 and making it possible to display the non-display image appropriately.

Figure 15:
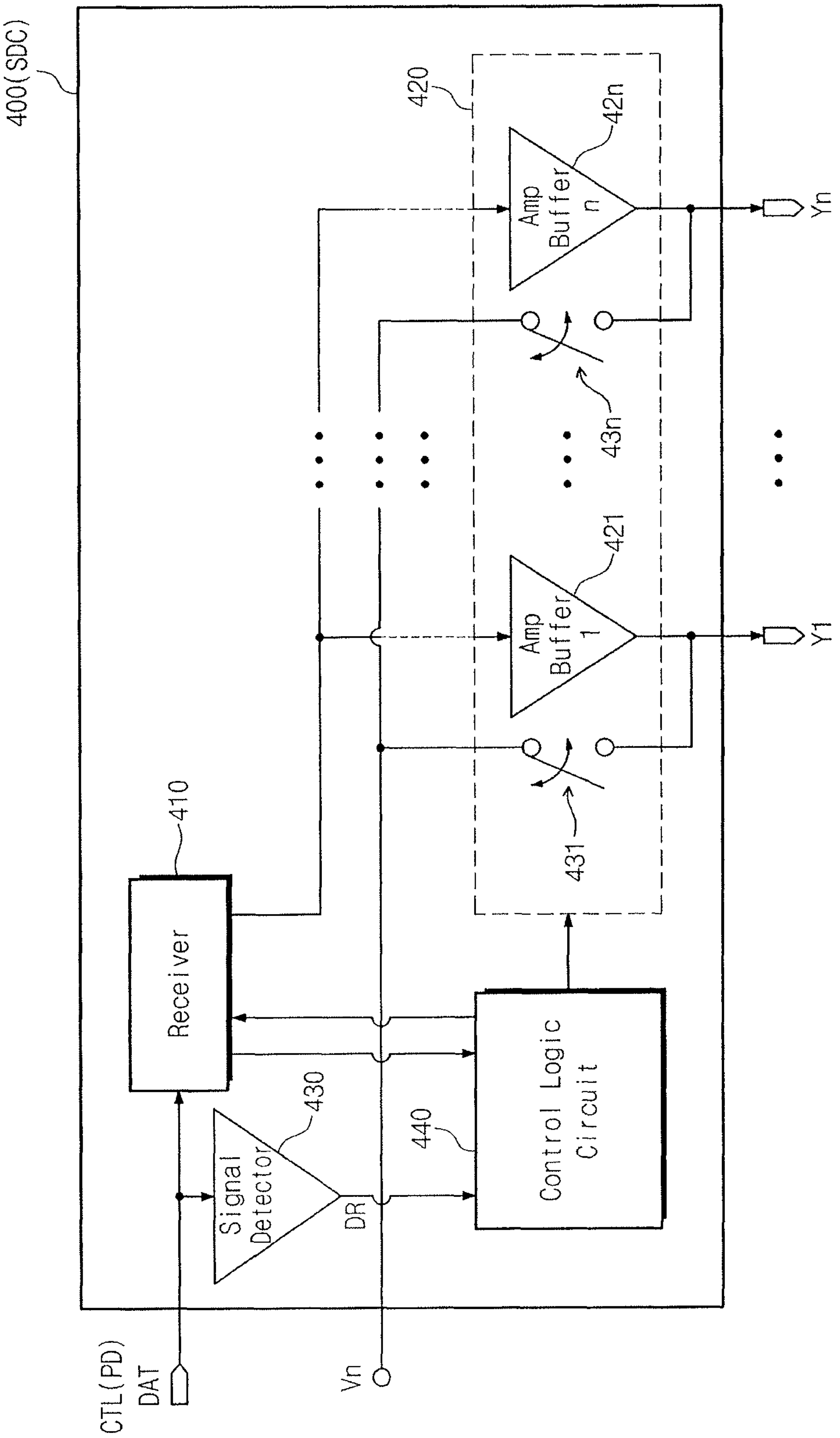
FIG. 15 illustrates a block diagram of a source driver circuit shown in FIG. 1 according to an example embodiment of the present disclosure.

FIG. 15 is a block diagram illustrating a source driver circuit shown in FIG. 1 according to an example embodiment of the present disclosure. A source driver circuit 400 may include a receiver 410, an amplifying buffer and switching element block 420, a signal detector 430, and a control logic circuit 440. The source driver circuit 400 may generate driving signals Y1 to Yn based on a control signal CTL and an image data signal DAT.

Configurations and functions of the receiver 410, amplifying buffers 421 to 42*n*, and the control logic circuit 440 may include those of a receiver 110, amplifying buffers 121 to 12*n*, and a control logic circuit 140 of FIG. 2. Configurations and functions of switching elements 431 to 43*n* may include those of switching elements 231 to 23*n* of FIG. 4. Configurations and functions of the signal detector 430 may include those of a signal detector 330 of FIG. 10. Thus, redundant descriptions thereof will be thus omitted below for brevity of the description.

Operations of the source driver circuit 400 according to an example embodiment of the present disclosure will be more fully described with reference to FIGS. 16 and 17.

Figure 16:
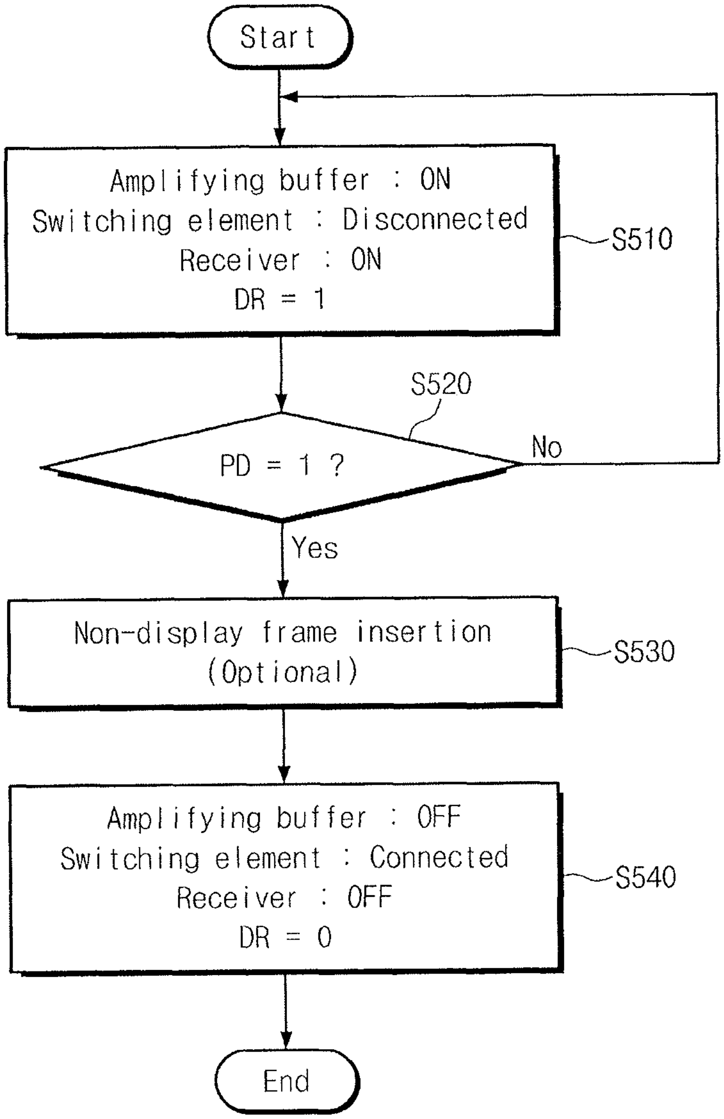
FIGS. 16 and 17 illustrate flowcharts describing an operation of a source driver circuit of FIG. 15.
Figure 17:
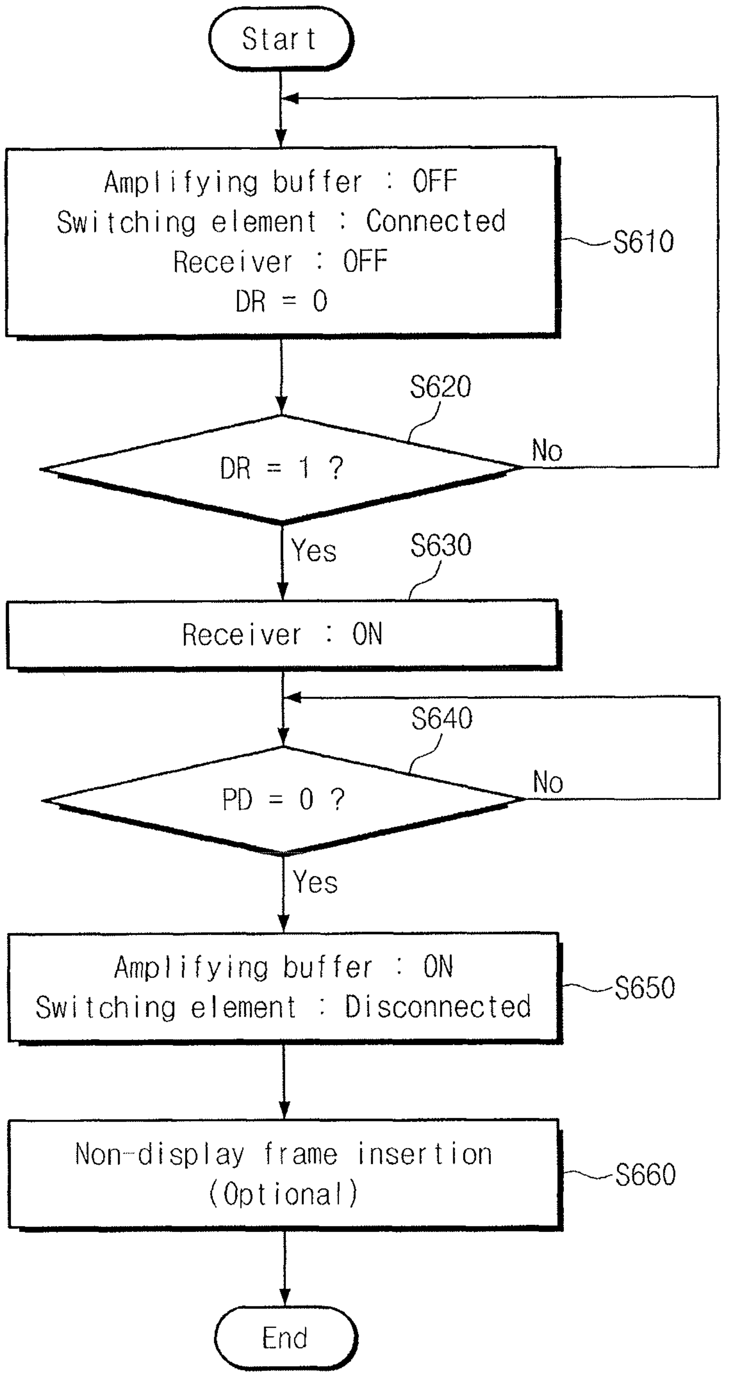

FIGS. 16 and 17 are flowcharts describing an operation of a source driver circuit of FIG. 15. FIG. 16 shows the case where an operating mode of a source driver circuit 400 of FIG. 15 transitions from a normal mode to a power-down mode. On the other hand, FIG. 16 shows the case where an operating mode of the source driver circuit 400 transitions from the power-down mode to the normal mode.

Referring to FIG. 16, in operation S510, an operation corresponding to the normal mode may be performed. In the normal mode, the source driver circuit 400 may drive the display area 1110 (refer to FIG. 1). In the normal mode, the control logic circuit 440 (refer to FIG. 15) may turn on the receiver 410 (refer to FIG. 15) and amplifying buffers 421 to 42*n* (refer to FIG. 15). Further, in the normal mode, the control logic circuit 440 may disconnect the output terminals of the amplifying buffers 421 to 42*n* from a non-display voltage node. In addition, in the normal mode, a signal detector 430 (refer to FIG. 15) may detect that a signal is provided through an input terminal.

In operation S520, the power-down signal PD may be provided to the receiver 410. When the power-down signal PD is not provided, the source driver circuit 400 may continue to operate in the normal mode. When the power-down signal PD is provided, the method may proceed to operation S530.

In operation S530, as an example embodiment, a non-display frame may be inserted according to a manner described with reference to FIGS. 8 and 9. Driving signals of which each has the same voltage value as a non-display voltage may be temporarily output through the amplifying buffers 421 to 42*n* having a strong driving capability, thereby improving a response speed of a display panel 1100 (refer to FIG. 1) and making it possible to display a non-display image appropriately.

In operation S540, an operation corresponding to the power-down mode may be performed. In the power-down mode, the source driver circuit 400 may drive the non-display area 1120. In the power-down mode, the control logic circuit 440 may turn off the receiver 410 and the amplifying buffers 421 to 42*n*. Further, in the power-down mode, the control logic circuit 440 may connect the output terminals of the amplifying buffers 421 to 42*n* to the non-display voltage node. In addition, in the power-down mode, the signal detector 430 may detect that a signal is not provided through the input terminal.

Referring to FIG. 17, in operation S610, an operation corresponding to the power-down mode may be performed. In the power-down mode, the source driver circuit 400 may drive the non-display area 1120. In the power-down mode, the control logic circuit 440 may turn off the receiver 410 and the amplifying buffers 421 to 42*n*. Further, in the power-down mode, the control of the control logic circuit 440 may connect the output terminals of the amplifying buffers 421 to 42*n* to the non-display voltage node. In addition, in the power-down mode, the signal detector 430 may detect that a signal is not provided through the input terminal.

In operation S620, the signal detector 430 may detect whether a signal is provided through the input terminal. When a signal is not provided through the input terminal, the source driver circuit 400 may continue to operate in the power-down mode. On the other hand, the method may proceed to operation S630 when the signal detector 430 detects that the image data signal DAT begins to be provided through the input terminal.

In operation S630, the control logic circuit 440 may turn on the receiver 410. After the receiver 410 is turned on, the receiver 410 may receive the control signal CTL and the image data signal DAT.

In operation S640, the power-down signal PD provided in operation S520 (refer to FIG. 16) may be released. When the power-down signal PD is continuously provided, the control logic circuit 440 may wait to receive the power-down signal PD through the turned-on receiver 410. The method may proceed to operation S650 when the provided power-down signal PD is released.

In operation S650, an operation corresponding to the normal mode may be performed. In the normal mode, the source driver circuit 400 may drive a display area 1110 (refer to FIG. 1). In the normal mode, the control logic circuit 440 may turn on the amplifying buffers 421 to 42*n*. Further, in the normal mode, the control logic circuit 440 may disconnect the output terminals of the amplifying buffers 221 to 22*n* disconnected from the non-display voltage node.

In operation S660, as an example embodiment, the non-display frame may be inserted. Inserting the non-display frame has been described with reference to FIGS. 8 and 9. Driving signals of which each has the same voltage value as the non-display voltage may be temporarily output through the amplifying buffers 421 to 42*n* having a strong driving capability, thereby improving a response speed of the display panel 1100 and making it possible to display the non-display image appropriately.

Figure 18:
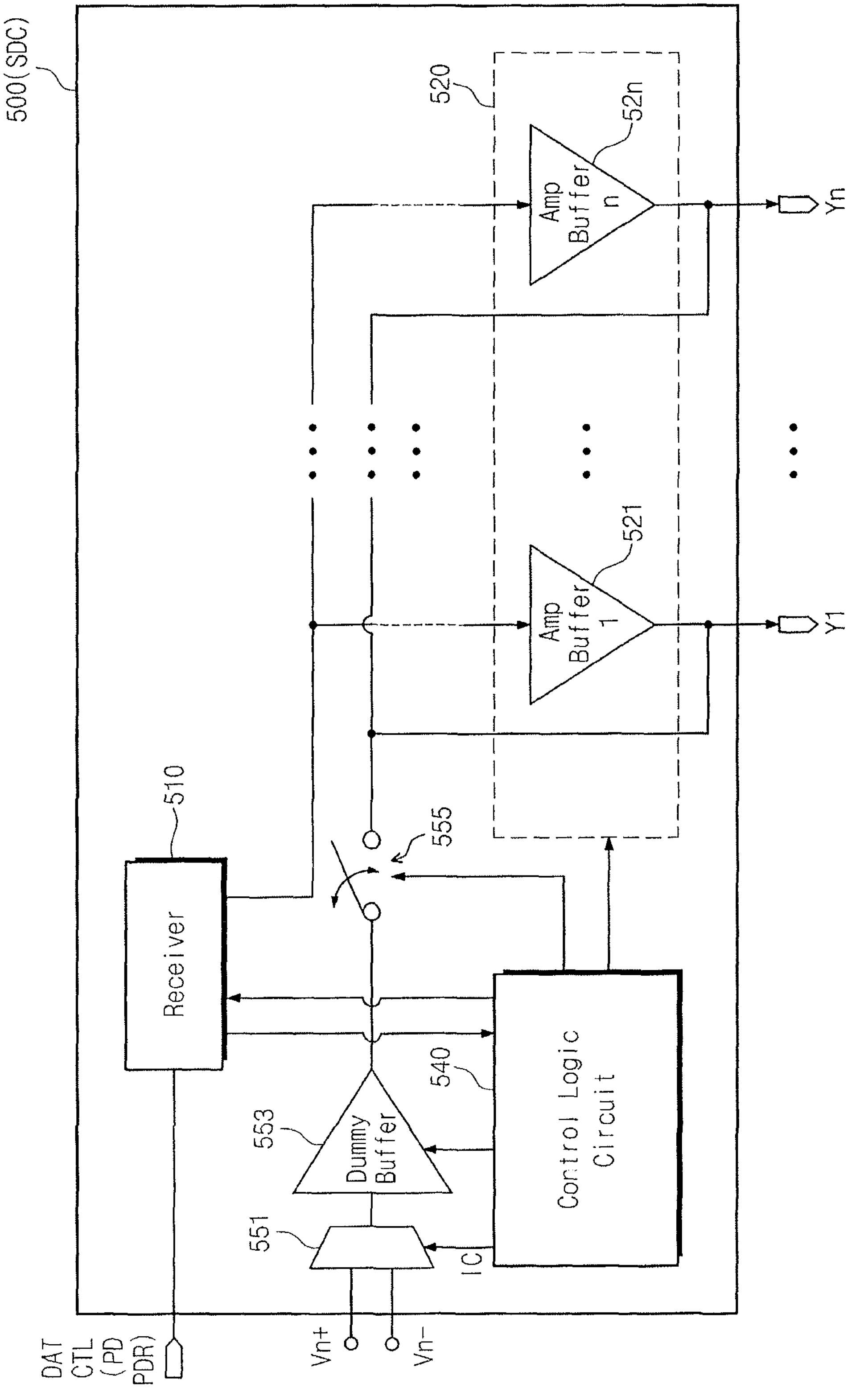
FIG. 18 illustrates a block diagram of a source driver circuit shown in FIG. 1 according to an example embodiment of the present disclosure.

FIG. 18 is a block diagram illustrating a source driver circuit shown in FIG. 1 according to an example embodiment of the present disclosure. A source driver circuit 500 may include a receiver 510, an amplifying buffer block 520, a control logic circuit 540, a selector 551, a dummy buffer 553, and a switching element 555. The source driver circuit 500 may receive a power-down signal PD and a power-down ready signal PDR. The source driver circuit 500 may generate driving signals Y1 to Yn.

Configurations and functions of the receiver 510, amplifying buffers 521 and 522, and the control logic circuit 540 may include those of the receiver 110, amplifying buffers 121 to 12*n*, and the control logic circuit 140 of FIG. 2, and redundant descriptions thereof will be thus omitted below for brevity of the description.

As described with reference to FIGS. 4 to 9 and 15 to 17, a non-display voltage Vn may be used to display a non-display image. In some example embodiments, two or more non-display voltages may be used. As an example embodiment, as illustrated in FIG. 18, two non-display voltages Vn+ and Vn− may be used to display a non-display image.

In some example embodiments, the display panel 1100 (refer to FIG. 1) may be a liquid crystal panel. Liquid crystal included in the liquid crystal panel may be aligned in different directions based on a polarity of a voltage applied thereto. For instance, when a voltage of a positive polarity is applied to the liquid crystal, the liquid crystal may be aligned in a first direction and, when a voltage of a negative polarity is applied to the liquid crystal, the liquid crystal may be aligned in a second direction, opposite the first direction. In this example embodiment, if one single non-display voltage is used to display a non-display image, the liquid crystal may be only aligned in the first direction or the second direction. However, the liquid crystal may be solidified when the liquid crystal is aligned in one direction during a long time.

Accordingly, as an example embodiment, two non-display voltages Vn+ and Vn− may be used to prevent solidification of the liquid crystal. For instance, each of the two non-display voltages Vn+ and Vn− may have a voltage value for driving a non-display area 1120 (refer to FIG. 1). However, for instance, the positive non-display voltage Vn+ may allow the liquid crystal to be aligned in the first direction, and the negative non-display voltage Vn− may allow the liquid crystal to be aligned in the second direction. An alignment direction of the liquid crystal may be inverted by using the two non-display voltages Vn+ and Vn− in turn, thereby preventing solidification of the liquid crystal.

The selector 551 may receive the two non-display voltages Vn+ and Vn−. For instance, the selector 551 may receive an inversion control signal IC from the control logic circuit 540. The selector 551 may select and output one of the two non-display voltages Vn+ and Vn− in response to the inversion control signal IC, which will be more fully described with reference to FIG. 22. For instance, the selector 551 may include a multiplexer circuit, but the present disclosure is not limited thereto.

The dummy buffer 553 may receive the non-display voltage output from the selector 551. The dummy buffer 553 may buffer the received non-display voltage. The dummy buffer 553 may provide the buffered non-display voltage to output terminals of the amplifying buffers 521 to 52*n*. As described above, the selector 551 may output the two non-display voltages Vn+ and Vn− in turn. The dummy buffer 553 may be used to quickly drive an output of the selector 551 that is continuously changed.

The switching element 555 may be between the output terminals of the amplifying buffers 521 to 52*n* and the dummy buffer 553. The switching element 555 may connect or disconnect the output terminals of the amplifying buffers 521 to 52*n* with the dummy buffer 553. As an example embodiment shown in FIG. 18, the source driver circuit 500 may include one switching element 555. As another example embodiment shown in FIG. 4, a plurality of switching elements 231 to 23*n* may be provided. An example embodiment of the present disclosure may be variously changed or modified.

For instance, the selector 551, the dummy buffer 553, and the switching element 555 may operate according to a control of the control logic circuit 540. The power-down ready signal PDR, the power-down signal PD, operations of the selector 551 and the dummy buffer 553 will be more fully described with reference to FIGS. 19 to 21.

Figure 19:
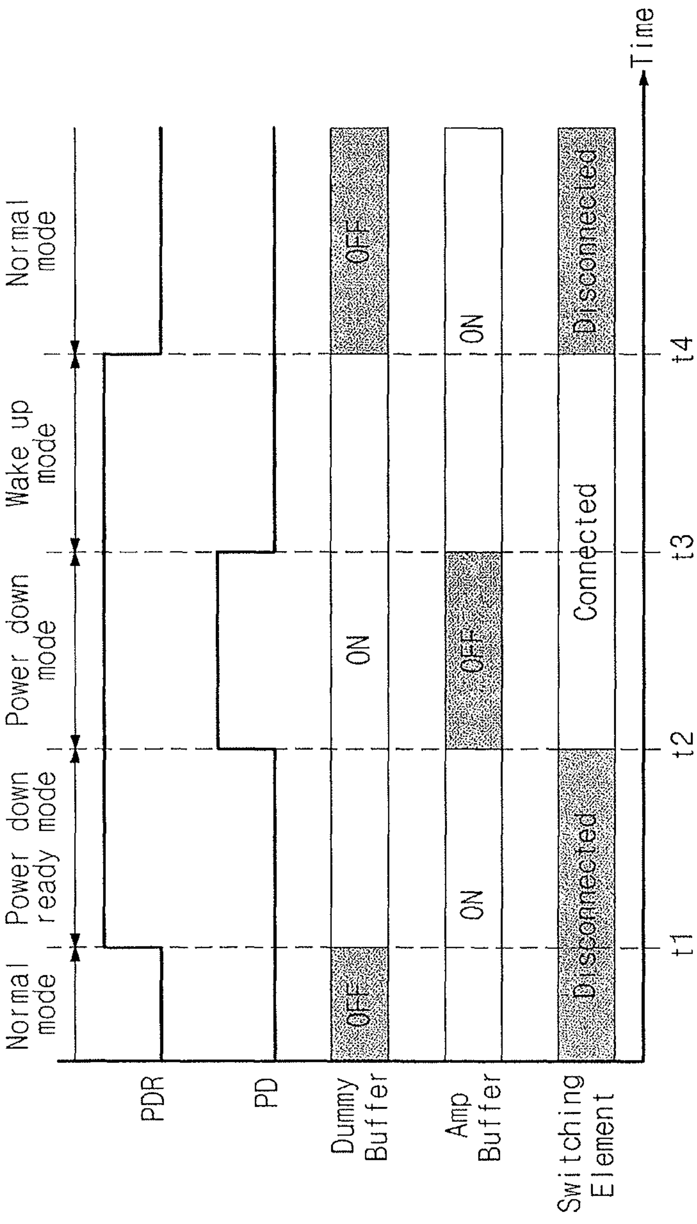
FIG. 19 illustrates a timing diagram describing an operation of a source driver circuit of FIG. 18.

FIG. 19 is a timing diagram describing an operation of a source driver circuit of FIG. 18.

Before time "t1", a source driver circuit 500 of FIG. 18 may operate in a normal mode. In the normal mode, the control logic circuit 540 (refer to FIG. 18) may turn on amplifying buffers 521 to 52*n* (refer to FIG. 18) to output driving signals Y1 to Yn (refer to FIG. 18). At this time, a dummy buffer 553 may be turned off, and a switching element 555 may be opened (i.e., disconnected).

For instance, a power-down ready signal PDR may be provided to a receiver 510 (refer to FIG. 18) at time "t1". The power-down ready signal PDR may be a signal informing that the source driver circuit 500 prepares to operate in the power-down mode. The power-down ready signal PDR may be configured similarly to the power-down signal PD described with reference to FIGS. 2 and 3, and detailed descriptions thereof will be thus omitted below.

For ease of explanation, it is assumed that the power-down ready signal PDR is provided when the power-down signal PDR has a logical value of "1". However, the power-down ready signal PDR may be variously modified or changed, and this assumption does not limit the present disclosure. When the power-down ready signal PDR is provided, the source driver circuit 500 may operate in a power-down ready mode.

In the power-down ready mode, the amplifying buffers 521 to 52*n* may still be turned on. In addition, the switching element 555 may still be opened. Thus, the amplifying buffers 521 to 52*n* may output the driving signals Y1 to Yn. However, in the power-down ready mode, a dummy buffer 553 (refer to FIG. 18) may be turned on. The dummy buffer 553 may output a signal having a voltage value of a non-display voltage Vn+ or Vn− (refer to FIG. 18) as each of the driving signals Y1 to Yn in the power-down ready mode. For this, in the power-down ready mode, the dummy buffer 553 may be turned on in advance, and may prepare to output the driving signals Y1 to Yn of which each has a voltage value of the non-display voltage Vn+ or Vn−.

For instance, at time "t2", the power-down signal PD may be provided. The source driver circuit 500 may operate in the power-down mode in response to the power-down signal PD. In the power-down mode, the amplifying buffers 521 to 52*n* may be turned off, thereby reducing the amount of power consumed by the source driver circuit 500.

In order to display a non-display image in the power-down mode, the dummy buffer 553 may continue to be turned on, and the switching element 555 may be closed (i.e., connected). Thus, the dummy buffer 553 may be connected with output terminals of the amplifying buffers 521 to 52*n*. In addition, one of two non-display voltages Vn+ and Vn− may be provided to the output terminals of the amplifying buffers 521 to 52*n* through a selector 551 (refer to FIG. 18), the dummy buffer 553, and the switching element 555. Accordingly, the source driver circuit 500 may output driving signals Y1 to Yn for displaying a non-display image through the output terminals of the amplifying buffers 521 to 52*n*.

For instance, at time "t3", when the power-down signal PD is released, the source driver circuit 500 may operate in a wake-up mode. In order to display a non-display image in the wake-up mode, the dummy buffer 553 may still be turned on. In addition, the switching element 555 may still be closed. However, in the wake-up mode, the amplifying buffers 521 to 52*n* may be turned on in advance. The amplifying buffers 521 to 52*n* may be turned on to output the driving signals Y1 to Yn in the normal mode, and may prepare to output the driving signals Y1 to Yn.

For instance, at time "t4", when the power-down ready signal PDR is released, the source driver circuit 500 may operates in the normal mode. In the normal mode, the dummy buffer 553 may be turned off, and the switching element 555 may be closed (i.e., disconnected). Thus, the amplifying buffers 521 to 52*n* may output the driving signals Y1 to Yn for displaying a user image.

Figure 20:
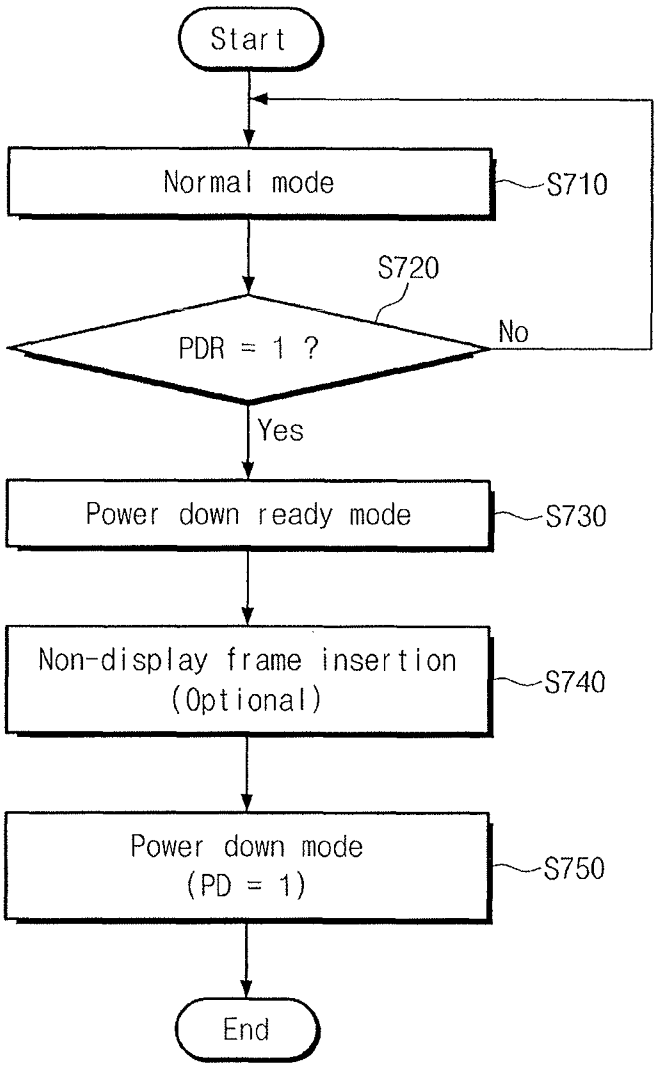
FIGS. 20 and 21 illustrate flowcharts describing an operation of a source driver circuit of FIG. 18.
Figure 21:
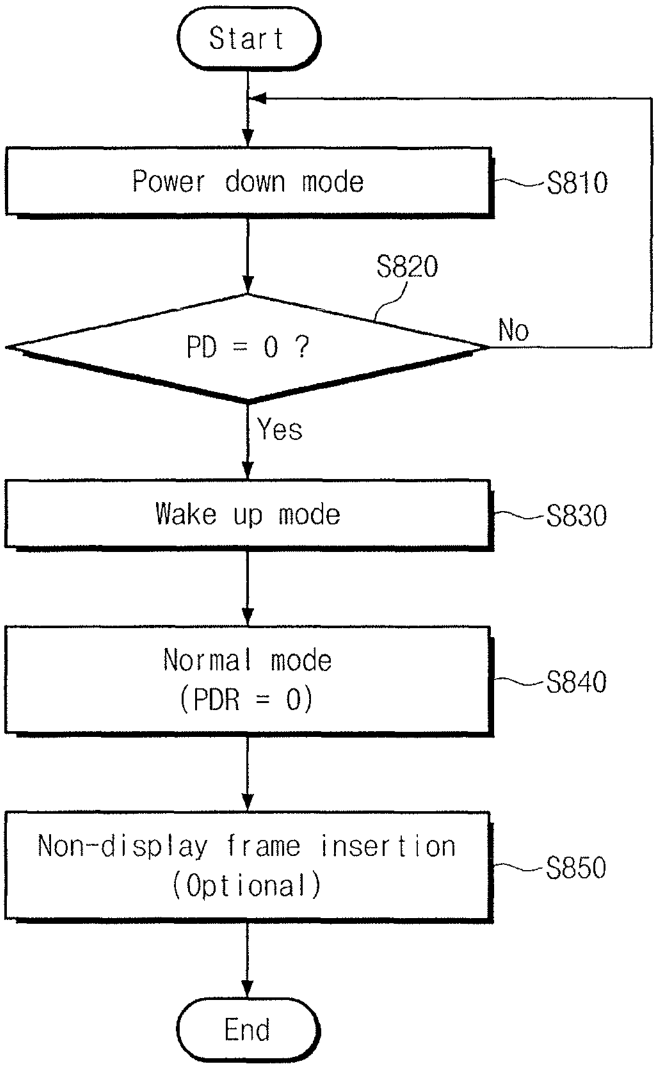

FIGS. 20 and 21 are flowcharts describing an operation of a source driver circuit of FIG. 18. FIG. 20 shows the case where an operating mode of a source driver circuit 500 of FIG. 18 transitions from a normal mode to a power-down mode. On the other hand, FIG. 21 shows the case where an operating mode of the source driver circuit 500 transitions from the power-down mode to the normal mode.

Referring to FIG. 20, in operation S710, an operation corresponding to the normal mode may be performed. In the normal mode, the source driver circuit 600 may drive a=the display area 1110 (refer to FIG. 1). In the normal mode, the control logic circuit 540 (refer to FIG. 18) may turn on amplifying buffers 521 to 52*n* (refer to FIG. 18). In addition, the dummy buffer 553 (refer to FIG. 18) may be turned off, and the switching element 555 (refer to FIG. 18) may be opened.

In operation S720, the power-down ready signal PDR may be provided to a receiver 510 (refer to FIG. 18). When the power-down ready signal PDR is not provided, the source driver circuit 500 may continue to operate in the normal mode. On the other hand, when the power-down ready signal PDR is provided, the method may proceed to operation S730.

In operation S730, an operation corresponding to the power-down read mode may be performed. In the power-down ready mode, the control logic circuit 540 may turn on the dummy buffer 553 in advance, i.e., before the power-down signal is received. The dummy buffer 553 may prepare to output driving signals Y1 to Yn (refer to FIG. 18) for displaying a non-display image.

In operation S740, as an example embodiment, a non-display frame may be inserted according to a manner described with reference to FIGS. 8 and 9, and redundant descriptions will be thus omitted below.

In operation S750, an operation corresponding to the power-down mode may be performed in response to the power-down signal PD. As an example embodiment, the power-down signal PD may be provided when time needed for an operation of the power-down ready mode passes after the power-down ready signal PDR is provided. In the power-down mode, the source driver circuit 500 may drive the non-display area 1120 (refer to FIG. 1). In the power-down mode, the amplifying buffers 521 to 52*n* may be turned off, thereby reducing the amount of power consumed by the source driver circuit 500. In order to display the non-display image in the power-down mode, the dummy buffer 553 may continue to be turned on, and the switching element 555 may be closed. Thus, the source driver circuit 500 may output driving signals Y1 to Yn for displaying the non-display image through the output terminals of the amplifying buffers 521 to 52*n*.

Referring to FIG. 21, in operation S810, an operation corresponding to the power-down mode may be performed. The amplifying buffers 521 to 52*n* may be turned off to reduce power consumed by the source driver circuit 500.

In operation S820, the power-down signal PD may be released. When the power-down signal PD continues to be provided, the source driver circuit 500 may still operate in the power-down mode. On the other hand, the method may proceed to operation S830 when the power-down signal PD is released.

In operation S830, an operation corresponding to a wake-up mode may be performed. In order to display the non-display image in the wake-up mode, the dummy buffer 553 may still be turned on. In addition, the switching element 555 may still be closed. However, in the wake-up mode, the amplifying buffers 521 to 52*n* may be turned on in advance. The amplifying buffers 521 to 52*n* may be turned on to output the driving signals Y1 to Yn in the normal mode, and may prepare to output the driving signals Y1 to Yn.

In operation S840, an operation corresponding to the normal mode may be performed in response to releasing the power-down ready signal PDR. As an example embodiment, the power-down ready signal PDR may be released if time needed for an operation of the wake-up mode passes after the power-down signal PD is released. In the normal mode, the dummy buffer 553 may be turned off, and the switching element 555 may be closed. Thus, the amplifying buffers 521 to 52*n* may output the driving signals Y1 to Yn for displaying a user image.

In operation S850, as an example embodiment, the non-display frame may be inserted according to a manner described with reference to FIGS. 8 and 9, and redundant descriptions will be thus omitted below.

Figure 22:
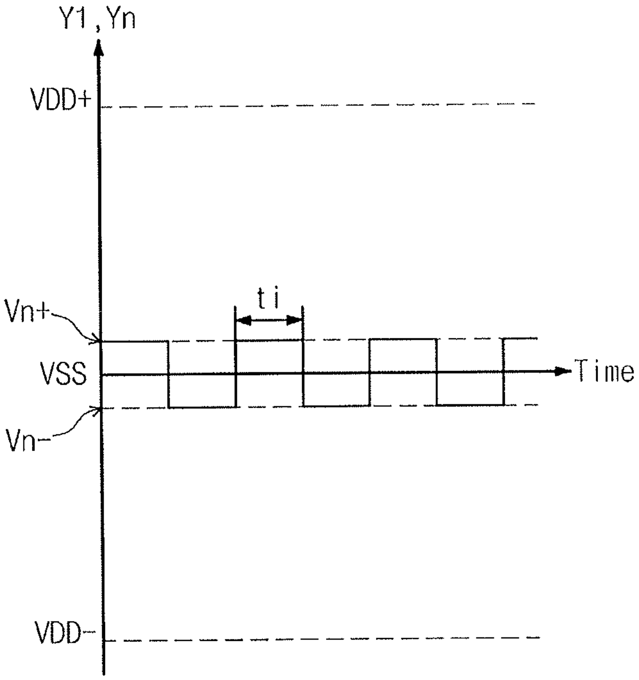
FIG. 22 illustrates a graph describing a waveform of a driving signal output when a source driver circuit of FIG. 18 operates in a power-down mode.

FIG. 22 is a graph describing a waveform of a driving signal output when a source driver circuit of FIG. 18 operates in a power-down mode.

Each of driving signals Y1 to Yn output from a source driver circuit 500 of FIG. 18 may have a voltage value, for example. This voltage value may have a positive value or a negative value on the basis of a reference value VSS (e.g., a ground voltage value). This voltage value may have a voltage value between a positive maximum value VDD+ and a negative maximum value VDD−.

As described above, two non-display voltages Vn+ and Vn− may be used to prevent solidification of liquid crystal. For instance, each of the two non-display voltages Vn+ and Vn− may have a voltage value for driving the non-display area 1120 (refer to FIG. 1). An alignment direction of the liquid crystal may continue to be inverted by outputting driving signals Y1 to Yn having voltage values of the two non-display voltages Vn+ and Vn− alternately.

The selector 551 (refer to FIG. 18), for instance, may output one of the two non-display voltages Vn+ and Vn− in response to an inversion control signal IC. For instance, the control logic circuit 540 (refer to FIG. 18) may change the inversion control signal IC at each and every inversion time period "ti". According to this, the selector 551 may output the two non-display voltages Vn+ and Vn− in turn at each and every inversion time period "ti". Thus, solidification of the liquid crystal may be prevented. For instance, a length of the inversion time period "ti" may correspond to one frame of an image to be displayed on a display panel 1100 (refer to FIG. 1), but the present disclosure is not limited thereto.

Figure 23:
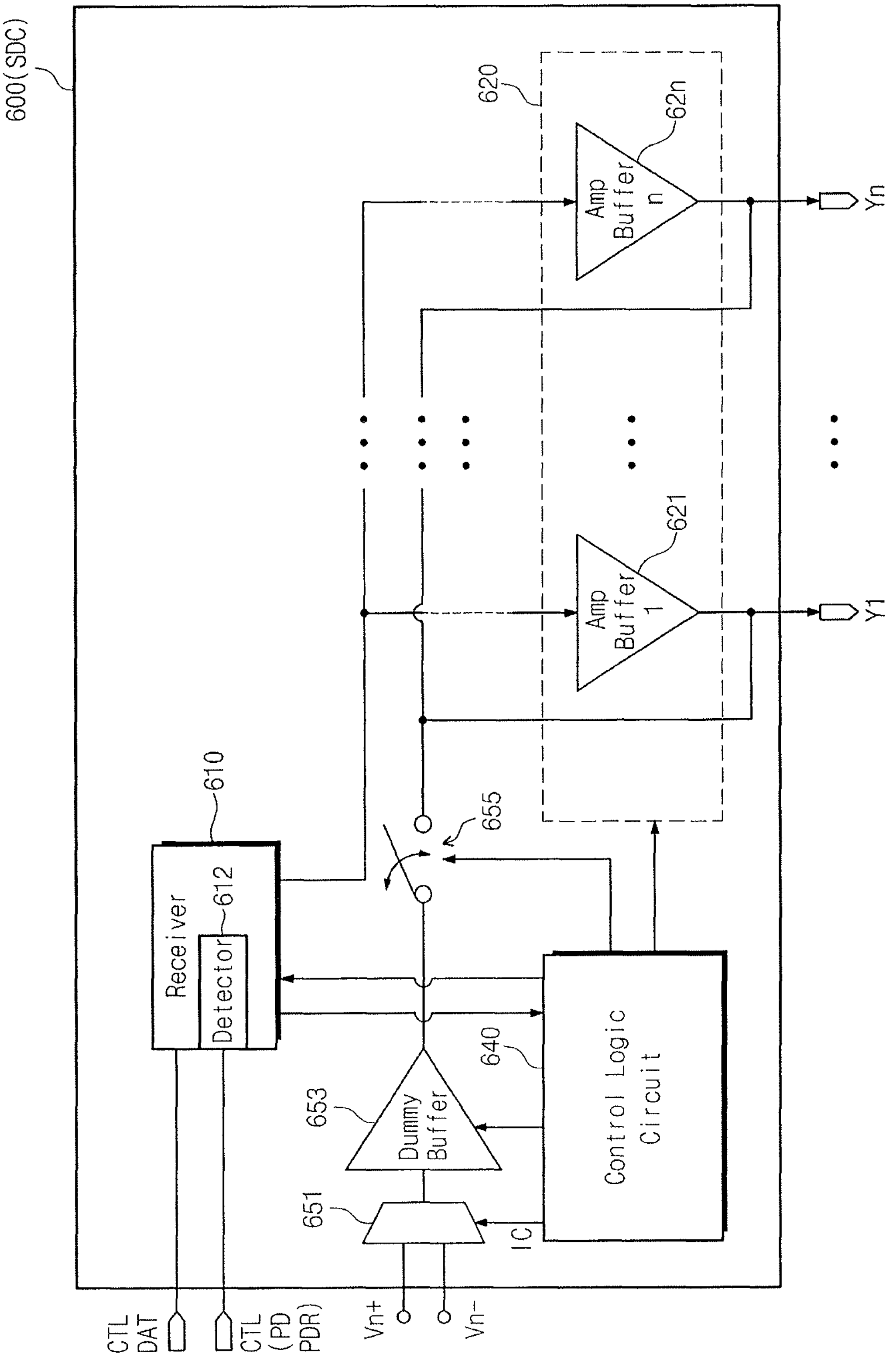
FIG. 23 illustrates a block diagram of a source driver circuit shown in FIG. 1 according to an example embodiment of the present disclosure.

FIG. 23 is a block diagram illustrating a source driver circuit shown in FIG. 1 according to an example embodiment of the present disclosure. A source driver circuit 600 may include a receiver 610, an amplifying buffer block 620, a control logic circuit 640, a selector 651, a dummy buffer 653, and a switching element 655. The source driver circuit 600 may receive a power-down signal PD and a power-down ready signal PDR. The source driver circuit 600 may generate driving signals Y1 to Yn.

Configurations and functions of the receiver 610, amplifying buffers 621 to 62*n*, and the control logic circuit 640 may include those of the receiver 110, amplifying buffers 121 to 12*n*, and the control logic circuit 140 of FIG. 2. Configurations and functions of the selector 651, the dummy buffer 653, and the switching element 655 may include those of the selector 551, the dummy buffer 553, and the switching element 555 of FIG. 18. Thus, redundant descriptions thereof will be omitted below.

As an example embodiment, as described with reference to FIGS. 10 to 17, the receiver 610 may be turned off in a power-down mode to reduce power consumed by the source driver circuit 600. Further, a signal detector 330 of FIG. 10 or a signal detector 430 of FIG. 15 may be used to detect a signal while the receiver 610 is being turned off.

As another example embodiment, as illustrated in FIG. 23, the receiver 610 may include a detector 612. In an example embodiment shown in FIG. 23, the receiver 610 may be turned off in the power-down mode. However, the whole receiver 610 may not be turned off, e.g., portions except for the detector 612 may be turned off. The detector 612 may not be turned off in the power-down mode, but may continue to be turned on to detect a signal.

Herein, the term "detector" is used, but it does not limit the present disclosure. As an example, the detector 612 may include a comparator circuit that receives a differential signal and determines a value corresponding to the differential signal. That is, the term "detector" is used to indicate a component capable of receiving and detecting a signal. The term "detector" is not used to restrict a function of the detector 612 to signal detection.

Figure 24:
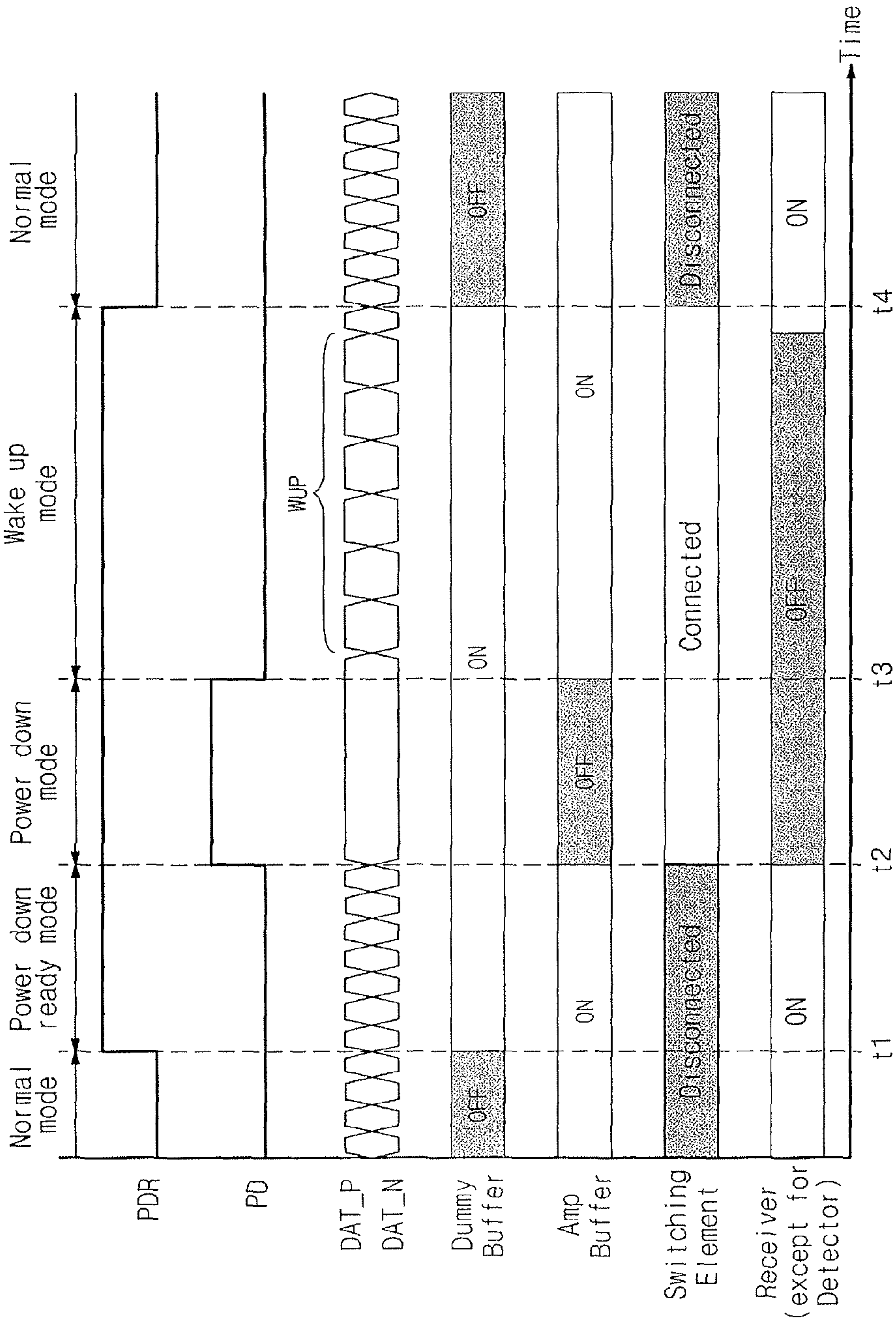
FIG. 24 illustrates a timing diagram describing an operation of a source driver circuit of FIG. 23.

FIG. 24 is a timing diagram describing an operation of a source driver circuit of FIG. 23.

Before time "t1", the source driver circuit 600 of FIG. 23 may operate in a normal mode. In the normal mode, the control logic circuit 640 (refer to FIG. 23) may turn on amplifying buffers 621 to 62*n* (refer to FIG. 23) to output driving signals Y1 to Yn (refer to FIG. 23). At this time, the dummy buffer 653 (refer to FIG. 23) may be turned off, and the switching element 655 (refer to FIG. 23) may be opened. Further, the receiver 610 (refer to FIG. 23) including the detector 612 (refer to FIG. 23) may be turned on. Thus, a differential data signal DAT_P and DAT_N may be received through the receiver 610. Here, it is assumed that a differential data signal is received, but this assumption does not limit the present disclosure.

For instance, the power-down ready signal PDR may be provided to the receiver 610 at time "t1". When the power-down ready signal PDR is provided, the source driver circuit 600 may operate in a power-down ready mode. In the power-down ready mode, the control logic circuit 640 may turn on the dummy buffer 653 in advance, and may prepare to output driving signals Y1 to Yn. Further, the receiver 610 may continue to be turned on and may receive the differential data signal DAT_P and DAT_N.

For instance, at time "t2", a power-down signal PD may be provided. The source driver circuit 600 may operate in a power-down mode in response to the power-down signal PD. In the power-down mode, the control logic circuit 640 may turn off the amplifying buffers 621 and 62*n*. Moreover, portions of the receiver 610 other than the detector 612 may be turned off, such that the source driver circuit 600 consumes a small amount of power in the power-down mode.

In order to display a non-display image in the power-down mode, the dummy buffer 653 may be turned on and the switching element 655 may be closed. Thus, two non-display voltages Vn+ and Vn− (refer to FIG. 23) may be alternately provided to output terminals of the amplifying buffers 621 to 62*n* (refer to FIG. 22). In addition, since the portions of the receiver 610 except for the detector 612 are turned off, the differential data signal DAT_P and DAT_N may not include meaningful information.

For instance, at time "t3", when the power-down signal PD is released, the source driver circuit 600 may operate in a wake-up mode. In the wake-up mode, the control logic circuit 640 may maintain the dummy buffer 653 in the turned on state and the switching element 655 in the closed state. However, the control logic circuit 640 may turn on the amplifying buffers 621 to 62*n* in advance, i.e., before the power-down ready signal is released, and may prepare to output the driving signals Y1 to Yn.

In the wake-up mode, for instance, the differential data signal DAT_P and DAT_N including a wake-up pattern WUP may be provided. For example, the wake-up pattern may include the power-down signal PD having been released, e.g., returned to 0, while the power-down ready signal PDR is not released, e.g., remains at 1. The wake-up pattern WUP may be a signal pattern informing that the source driver circuit 600 prepares to operate in the normal mode. The wake-up pattern WUP may be variously changed or modified. Since the detector 612 continues to be turned on, the detector 612 may detect the wake-up pattern WUP. The receiver 610 may be turned on when the detector 612 detects the wake-up pattern WUP.

For instance, at time "t4", the power-down ready signal PDR may be released. Since the receiver 610 is turned on, the receiver 610 may recognize that the power-down ready signal PDR is released. When the power-down ready signal PDR is released, the source driver circuit 600 may operate in the normal mode. In the normal mode, the differential data signal DAT_P and DAT_N may be received through the receiver 610. Further, the dummy buffer 653 may be turned off, and the switching element 655 may be opened. Thus, the amplifying buffers 621 to 62*n* may output the driving signals Y1 to Yn for displaying a user image.

Figure 25:
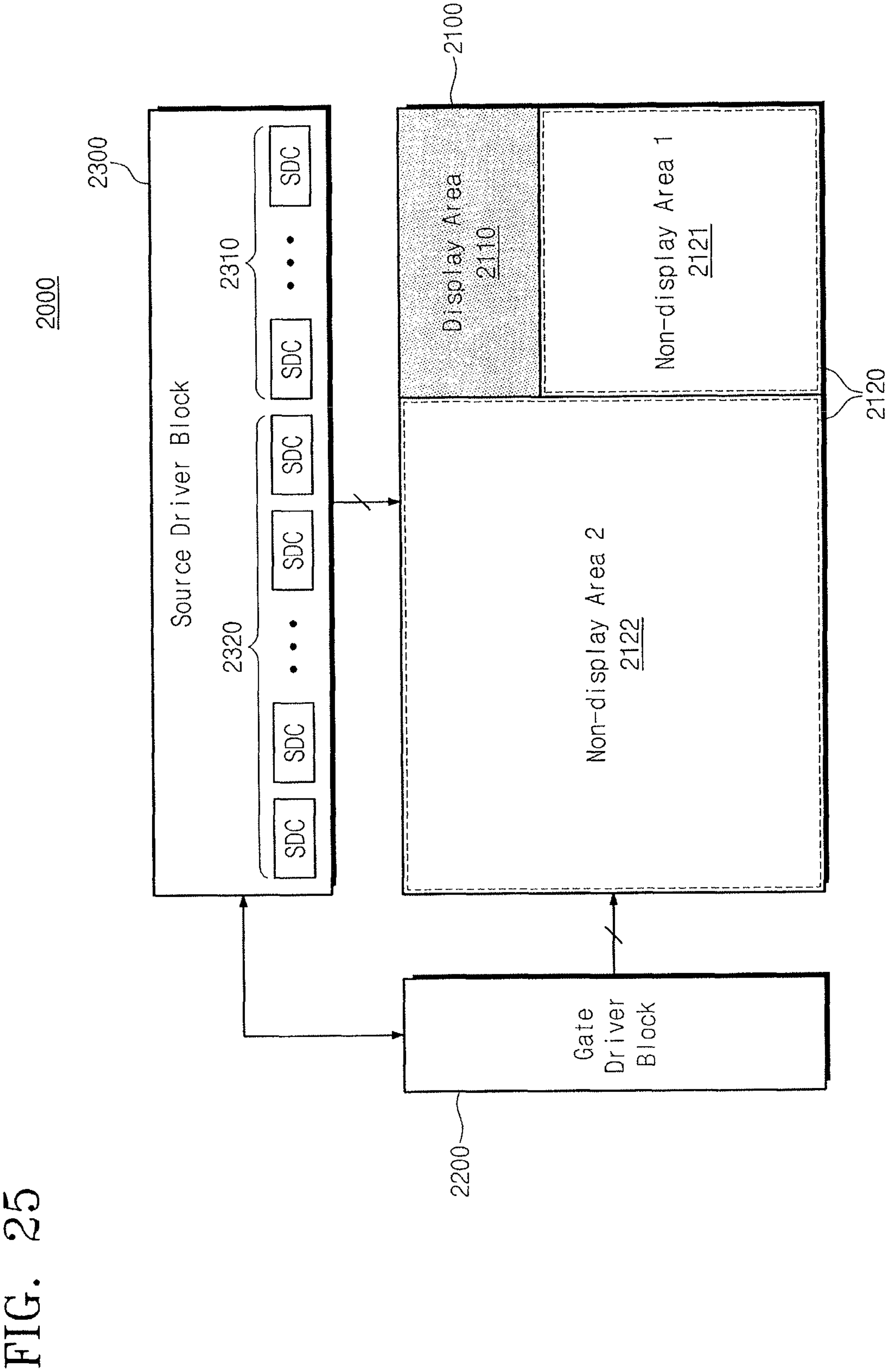
FIG. 25 illustrates a block diagram of a display device according to an example embodiment of the present disclosure.

FIG. 25 is a block diagram illustrating a display device according to an example embodiment of the present disclosure. A display device 2000 may include a display panel 2100, a gate driver block 2200, and a source driver block 2300. The display device 2000 may include other components not illustrated in FIG. 25.

Configurations and functions of the display panel 2100, the gate driver block 2200, and the source driver block 2300 may include those of the display panel 1100, the gate driver block 1200, and the source driver block 1300 of FIG. 1, respectively. Thus, redundant descriptions will be omitted below for brevity of the description.

As an example embodiment, the display device 2000 may perform a partial display function in which visual information to be provided to a user is displayed on a partial area of the display panel 2100. In this example embodiment, the display panel 2100 may include a display area 2110 and a non-display area 2120.

As described with reference to FIG. 1, the display area 2110 may display a user image associated with visual information to be provided to the user. The display area 2110 may be driven by a first source driver circuit group 2310.

The first source driver circuit group 2310 may include one or more source driver circuits from among a plurality of source driver circuits included in the source driver block 2300.

As described with reference to FIG. 1, the non-display area 2120 may display a non-display image instead of the visual information to be provided to the user. For instance, the non-display area 2120 may include a first non-display area 2121 and a second non-display area 2122. The first non-display area 2121 may be driven by the first source driver circuit group 2310. The second non-display area 2122 may be driven by a second source driver circuit group 2320. The second source driver circuit group 2320 may include one or more source driver circuits, which are not included in the first source driver circuit group 2310, from among the plurality of source driver circuits.

However, as described with reference to FIG. 1, the display panel 2100 may not include at least one of the display area 2110, the first non-display area 2121, and the second non-display area 2122. In addition, locations and sizes of the display area 2110, the first non-display area 2121, and the second non-display area 2122 may be adjustable.

Each of source driver circuits included in the source driver block 2300 may be implemented according to at least one of example embodiments of the present disclosure described with reference to FIGS. 7 to 24. As an example embodiment, a source driver circuit not receiving a power-down signal from among the plurality of source driver circuits may output driving signals for displaying the user image. Additionally, a source driver circuit receiving the power-down signal from among the plurality of source driver circuits may output driving signals of which each has the same voltage value as a non-display voltage for displaying the non-display image.

The one or more source driver circuits included in the second source driver circuit group 2320 may drive the second non-display area 2122 for displaying the non-display image. Thus, the power-down signal may be provided to a receiver of a source driver circuit included in the second source driver circuit group 2320.

As an example embodiment, each source driver circuit may include a plurality of switching elements. As described with reference to FIG. 4, each switching element may correspond to one of a plurality of amplifying elements. The switching element may connect or disconnect an output terminal of a corresponding amplifying buffer with a non-display voltage node. According to this example embodiment, in a source driver circuit included in the second source driver circuit group 2320, a control logic circuit may permit amplifying buffers to be turned off and the non-display node and output terminals of the amplifying buffers to be connected. This example embodiment has been described with reference to FIGS. 4 to 9 and 15 to 17.

As an example embodiment, each source driver circuit may include a signal detector. As described with reference to FIG. 10, the signal detector may detect a signal provided through an input terminal. According to this example embodiment, in a source driver circuit included in the second source driver circuit group 2320, a receiver may be turned off according to a control of a control logic circuit. When the signal detector detects that a signal begins to be provided through the input terminal with the receiver being turned off, the receiver may be turned on according to a control of the control logic circuit. This example embodiment has been described with reference to FIGS. 10 to 17.

As an example embodiment, each source driver circuit may include a selector, a dummy buffer, and a switching element. The selector, the dummy buffer, and the switching element may be used to provide one of two or more non-display voltages to output terminals of amplifying buffers in a power-down mode. This example embodiment has been described with reference to FIGS. 18 to 22.

As an example embodiment, each source driver circuit may include a receiver that includes a detector. The detector may not be turned off in the power-down mode, and may be used to detect a signal of a wake-up pattern. This example embodiment has been described with reference to FIGS. 23 and 24.

One or more source driver circuits included in the first source driver circuit group 2310 may drive the first non-display area 2121 for displaying the non-display image. Also, one or more source driver circuits included in the first source driver circuit group 2310 may drive the display area 2110 for displaying the user image. Thus, in some example embodiments, a power-down signal may not be provided to a receiver of a source driver circuit included in the first source driver circuit group 2310.

However, in other example embodiments, a source driver circuit included in the first source driver circuit group 2310 may differently operate when driving the display area 2110 and when driving the first non-display area 2121. While the display panel 2100 is receiving gating signals corresponding to the display area 2110, the power-down signal may not be provided to a receiver of a source driver circuit included in the first source driver circuit group 2310. While the display panel 2100 is receiving gating signals corresponding to the first non-display area 2121, the power-down signal may be provided to a receiver of a source driver circuit included in the first source driver circuit group 2310. That is, a source driver circuit included in the first source driver circuit group 2310 may not receive the power-down signal when driving the display area 2110, and may receive the power-down signal when driving the first non-display area 2121.

When a source driver circuit included in the first source driver circuit group 2310 receives the power-down signal (i.e., while the first non-display area 2121 is being driven), a source driver circuit included in the first source driver circuit group 2310 may operate according to at least one of example embodiments of the present disclosure described with reference to FIGS. 2 to 24. As an example embodiment, when the power-down signal is provided, at least one of a receiver and amplifying buffers may be turned off. As an example embodiment, the receiver may be turned on when a signal detector detects that a signal begins to be provided through an input terminal or when a detector detects a signal of a wake-up pattern. Redundant descriptions associated with example embodiments of the present disclosure will be omitted below.

According to an example embodiment of the present disclosure, a source driver circuit driving the non-display area 2120 may consume a small amount of power. Accordingly, power consumed by the display device 2000 performing a partial display function may be markedly reduced.

Figure 26:
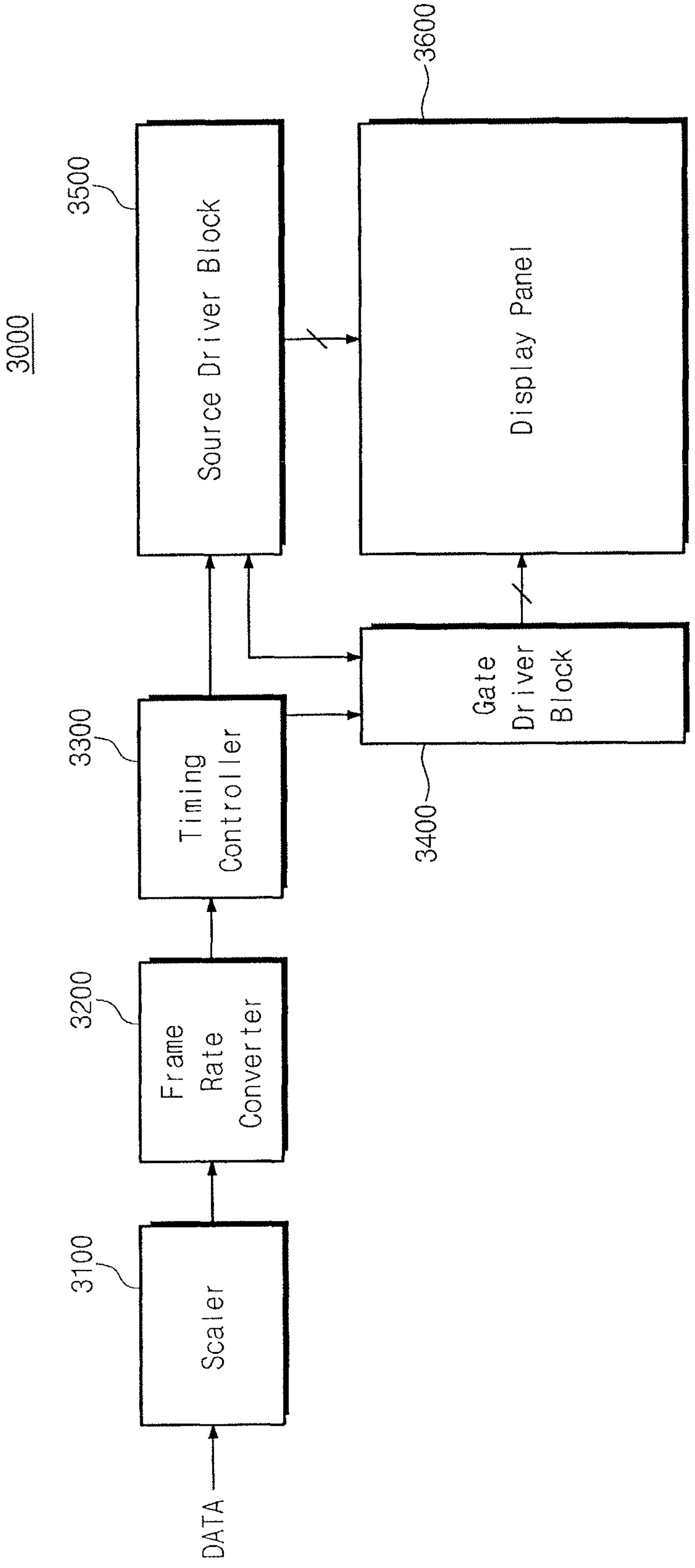
FIG. 26 illustrates a block diagram of a display device according to an example embodiment of the present disclosure.

FIG. 26 is a block diagram illustrating a display device according to an example embodiment of the present disclosure. A display device 3000 may include a scaler 3100, a frame rate converter 3200, a timing controller 3300, a gate driver block 3400, a source driver block 3500, and a display panel 3600. The display device 3000 may include other components not shown in FIG. 26, or may not include one or more components shown in FIG. 26.

The scaler 3100 may receive data corresponding to an image to be displayed on the display panel 3600. The scaler 3100 may process the data to make the data have resolution information suitable for an image to be displayed on the display panel 3600. The frame rate converter 3200 may receive the data processed by the scaler 3100. The frame rate converter 3200 may process the received data to adjust the frequency (i.e., a "frame rate") for displaying each frame on the display panel 3600.

The timing controller 3300 may control an image output of the display panel 3600 by controlling the gate driver block 3400 and the source driver block 3500. The gate driver block 3400 may provide gating signals to the display panel 3600. The source driver block 3500 may provide driving signals to the display panel 3600. The display panel 3600 may display an image based on received signals.

Configurations and functions of the timing controller 3300, the gate driver block 3400, the source driver block 3500, and the display panel 3600 may include those of the timing controller 1400, the gate driver block 1200, the source driver block 1300, and the display panel 1100 of FIG. 1, respectively. Configurations and functions of the source driver block 3500 may further include those of the source driver block 2300 of FIG. 25. Thus, redundant descriptions will be omitted below.

The source driver block 3500 may include a plurality of source driver circuits. Each source driver circuit included in the source driver block 3500 may be implemented and may operate according to at least one of example embodiments of the present disclosure described with reference to FIGS. 2 to 24. As an example embodiment, when a power-down signal is provided, at least one of a receiver or amplifying buffers may be turned off. As an example embodiment, the receiver may be turned on when a signal detector detects that a signal begins to be provided through an input terminal or when a detector detects a signal of a wake-up pattern. Redundant descriptions will be omitted below for brevity of the description.

A configuration illustrated in each conceptual diagram should be understood just from a conceptual point of view. Shape, structure, and size of each component illustrated in each conceptual diagram are exaggerated or downsized for understanding of the present disclosure. An actually implemented configuration may have a physical shape different from a configuration of each conceptual diagram. The present disclosure is not limited to a physical shape or size illustrated in each conceptual diagram.

A device configuration illustrated in each block diagram is provided to help understanding of the present disclosure. Each block may be formed of smaller blocks according to a function. Alternatively, a plurality of blocks may form a larger block according to functions. That is, the present disclosure is not limited to components illustrated in each block diagram.

In embodiments, the one or more outputs may take various forms. For example, when the control logic circuit is embodied within an integrated circuit chip, the one or more outputs may be one or more output terminals, leads, wires, ports, signal lines, and/or other type of interface without or coupled to the control logic circuit.

The control logic circuit and other processing features of the embodiments described herein may be implemented in logic, which, for example, may include hardware, software, or both. When implemented at least partially in hardware, the control logic circuits and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the control logic circuit and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

By way of summation and review, the present disclosure provides a source driver circuit and a display device to reduce power consumed by a source driver circuit driving a non-display area. According to an example embodiment of the present disclosure, a receiver of the source driver circuit driving the non-display area may receive a power-down signal or command. In addition, at least one of an amplifying buffer and a receiver included in the source driver circuit driving the non-display area may be turned off in response to receiving the power-down signal or command.

In contrast, when the source driver circuit driving the non-display area continues to fully operate, unnecessary power consumption increases since the non-display area does not display the visual information to be provided to the user.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A source driver circuit, comprising:

a receiver to receive an image data signal;

a plurality of amplifying buffers, each of the plurality of amplifying buffers including an output terminal to output a driving signal, the driving signal being generated based on the image data signal; and a plurality of switching elements respectively corresponding to the plurality of amplifying buffers, each of the plurality of switching elements being configured to transfer a non-display voltage to each of the output terminal of a corresponding one of the plurality of amplifying buffers according to a power-down signal, wherein, when the power-down signal is activated, at least one of the plurality of switching elements is turned-on to transfer the non-display voltage to corresponding output terminal.

2. The source driver circuit of claim 1, wherein when the power-down signal is activated, at least one of the plurality of amplifying buffers is turned-off.

3. The source driver circuit of claim 1, wherein the non-display voltage includes a first voltage value and a second voltage value for driving a non-display area of a display panel.

4. The source driver circuit of claim 3, further comprising:

a selector to alternately output the first voltage value and the second voltage value at each and every inversion time period.

5. The source driver circuit of claim 4, wherein a length of the inversion time period corresponds to one frame of an image to be displayed on the display panel.

6. The source driver circuit of claim 4, further comprising:

a dummy buffer to receive the first voltage value and the second voltage value output from the selector, and to provide the first voltage value and the second voltage value to the output terminal of each of the plurality of amplifying buffers corresponding to the non-display area of the display panel.

7. A display device, comprising:

a display panel including a display area on which an image is displayed and a non-display area; and a source driver circuit including an amplifying buffer and a switching element to drive an output terminal of the amplifying buffer with a driving signal corresponding to the received image data signal or a non-display voltage, the source driver circuit receives a power-down signal for driving the output terminal, wherein the switching element transfers the non-display voltage to the output terminal of the amplifying buffer corresponding to the non-display area of the display panel.

8. The display device of claim 7, further comprising:

a gate driver circuit to provide a gating signal to the display panel such that the area to which the driving signal or the non-display voltage is provided is selected; and a timing controller to control an output timing of the driving signal and to provide the power-down signal to the source driver circuit.

9. The display device of claim 7, wherein the source driver circuit selectively outputs the non-display voltage or the driving signal based on whether the power-down signal is received or not.

10. The display device of claim 7, wherein when the power-down signal is activated, the amplifying buffer is turned-off.

11. The display device of claim 7, wherein the non-display voltage includes a first voltage value and a second voltage value to be alternately provided to the output terminal of the amplifying buffer, wherein the source driver circuit further includes:

a selector to alternately output the first voltage value and the second voltage value at each and every inversion time period; and a dummy buffer to receive the first voltage value and the second voltage value output from the selector, and to provide the first voltage value and the second voltage value to the output terminal of the amplifying buffer corresponding to the non-display area of the display panel.

* * * * *